US012768488B2

(12) United States Patent
Jalilian et al.

(10) Patent No.: US 12,768,488 B2
(45) Date of Patent: *Oct. 20, 2026

(54) METHODS AND SYSTEMS FOR TRACKING A PIPELINE INSPECTION GAUGE

(71) Applicant: HIFI ENGINEERING INC., Calgary (CA)

(72) Inventors: Seyed Ehsan Jalilian, Calgary (CA); Mehri Owjimehr, Calgary (CA); Arne Dankers, Calgary (CA); Yuhong Liu, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 500 days.

This patent is subject to a terminal disclaimer.

(21) Appl. No.: 18/057,644

(22) Filed: Nov. 21, 2022

(65) Prior Publication Data

US 2023/0102764 A1 Mar. 30, 2023

Related U.S. Application Data

(63) Continuation of application No. PCT/CA2021/051099, filed on Aug. 6, 2021.

(Continued)

(51) Int. Cl.

| | |
|---|---|
| ***F16L 55/48*** | (2006.01) |
| ***F16L 101/30*** | (2006.01) |
| ***G01D 5/26*** | (2006.01) |

(52) U.S. Cl.

CPC .............. *F16L 55/48* (2013.01); *G01D 5/266* (2013.01); *G01D 5/268* (2013.01); *F16L 2101/30* (2013.01)

(58) Field of Classification Search

None

See application file for complete search history.

(56) References Cited

U.S. PATENT DOCUMENTS 4,363,114 A * 12/1982 Bucaro .................. G01H 9/004 367/149

5,272,646 A 12/1993 Farmer (Continued)

FOREIGN PATENT DOCUMENTS

WO 1995003526 A1 2/1995

WO 2013102252 A1 7/2013

(Continued)

OTHER PUBLICATIONS

Mashford, John & Silva, Dhammika & Marney, Donavan & Burn, S . . . (2009). An Approach to Leak Detection in Pipe Networks Using Analysis of Monitored Pressure Values by Support Vector Machine. NSS 2009—Network and System Security. 534-539. 10.1109/NSS.2009.38. (Year: 2009).*

(Continued)

*Primary Examiner* — Matthew G Marini

(74) *Attorney, Agent, or Firm* — D'Ambrosio & Menon, PLLC; Usha Menon

(57) ABSTRACT

There is described a method of determining a position of a pipeline inspection gauge (PIG) in a fluid conduit. While the PIG is moving through the fluid conduit, one or more sensors positioned along the fluid conduit are used to detect one or more signals. Parameter data is extracted from the detected one or more signals. The parameter data includes one or more parameters of the detected one or more signals as a function of time and position along the fluid conduit. PIG movement data indicative of a position of the PIG in the fluid conduit as a function of time is generated using the parameter data.

22 Claims, 31 Drawing Sheets

Related U.S. Application Data

(60) Provisional application No. 63/063,574, filed on Aug. 10, 2020.

(56) References Cited

U.S. PATENT DOCUMENTS

| | | | | |
|---|---|---|---|---|
| 6,243,657 | B1 | 6/2001 | Tuck et al. | |
| 2010/0305875 | A1 | 12/2010 | Williams et al. | |
| 2011/0139538 | A1 * | 6/2011 | Hill | G01H 9/004 181/123 |
| 2015/0331007 | A1 | 11/2015 | Giunta et al. | |
| 2016/0025684 | A1 | 1/2016 | Deneuville | |
| 2016/0338274 | A1 | 11/2016 | Messner | |
| 2021/0172824 | A1 | 6/2021 | Parson et al. | |

FOREIGN PATENT DOCUMENTS

| | | | | |
|---|---|---|---|---|
| WO | 2017147679 | A1 | 9/2017 | |
| WO | WO-2019018947 | A1 * | 1/2019 | E21B 47/117 |

OTHER PUBLICATIONS

Cong Huang et al. “Pipeline Inspection Guage Positioning System Based on Optical Fiber Distributed Acoustic Sensing” Nov. 15, 2021 IEEE vol. 21, p. 1.

* cited by examiner

METHODS AND SYSTEMS FOR TRACKING A PIPELINE INSPECTION GAUGE

CROSS-REFERENCE TO RELATED APPLICATION

This application is a bypass continuation of International Application No.: PCT/CA2021/051099 filed on Aug. 6, 2021, which claims the benefit of U.S. patent application Ser. No.: 63/063,574, filed Aug. 10, 2020, the entire contents of which are incorporated by reference in their entirety.

FIELD OF THE DISCLOSURE

The present disclosure relate to methods and systems for tracking a Pipeline Inspection Gauge (PIG).

BACKGROUND TO THE DISCLOSURE

Pipeline Inspection Gauges (PIGs) are devices used for the maintenance of pipelines. A PIG is introduced into a pipeline using a suitable launcher, and the PIG is then transported along the pipeline under pressure from the flow of fluid within the pipeline. PIGs may be used, for example, for cleaning the interior surface of the pipeline or for inspecting the pipeline to collect data on wall thickness, signs of corrosion, etc.

One problem with using PIGs to clean pipelines is that, without knowing the speed at which the PIG is moving, it can be difficult to determine at what point in time the PIG will exit the pipeline. Furthermore, PIGs can occasionally become stuck in the pipeline, and it can be difficult to remove the PIG without knowing where in the pipeline the PIG is stuck.

SUMMARY OF THE DISCLOSURE

According to a first aspect of the disclosure, there is provided a method of determining a position of a pipeline inspection gauge (PIG) in a fluid conduit, comprising: while the PIG is moving through the fluid conduit, using one or more sensors positioned along the fluid conduit to detect one or more signals; extracting parameter data from the detected one or more signals, wherein the parameter data comprises one or more parameters of the detected one or more signals as a function of time and position along the fluid conduit; and generating, using the parameter data, PIG movement data indicative of a position of the PIG in the fluid conduit as a function of time.

The method may further comprise, before detecting the one or more signals, launching the PIG into the fluid conduit.

The one or more sensors may comprise one or more lengths of optical fiber.

Detecting the one or more signals may comprise interrogating the one or more lengths of optical fiber using an optical fiber interrogator configured to transmit one or more light pulses along the one or more lengths of optical fiber and to detect reflections of the one or more light pulses.

The one or more signals may comprise one or more of acoustic signals and strain signals.

The one or more parameters may comprise one or more of: a first parameter comprising a ratio of a power of the one or more signals in a mid-range frequency band to a power of the one or more signals in a high-range frequency band; a second parameter comprising a magnitude of the one or more signals; and a third parameter comprising strain experienced by the one or more sensors.

The mid-range frequency band may be from about 100 Hz to about 300 Hz and the high-range frequency band may be from about 3 kHz to about 4 kHz.

Generating the PIG movement data may comprise: generating the PIG movement data using a combination of the first parameter and the third parameter; or generating the PIG movement data using a combination of the second parameter and the third parameter.

Generating the PIG movement data may comprise filtering the parameter data by: applying one or more threshold functions to the parameter data; and based on the application of the one or more threshold functions, determining whether to discard at least some of the parameter data.

The one or more threshold functions may comprise one or more of: one or more local threshold functions applicable to parameter data associated with one or more respective portions of the fluid conduit; and a global threshold function applicable to all of the parameter data.

Generating the PIG movement data may comprise: extracting, from the parameter data, one or more signatures for each parameter; and generating, using the one or more signatures, the PIG movement data.

Generating the PIG movement data may further comprise: inputting the one or more signatures to a trained classifier; and generating, using the classifier, the PIG movement data.

The classifier may comprise a support vector machine.

The PIG may be moving through the fluid conduit in a first direction, and the method may further comprise filtering the PIG movement data by: identifying in the PIG movement data, and discarding, PIG movement data indicative of the PIG moving in a second direction that is not the first direction.

The PIG may be moving through the fluid conduit at a speed that is less than or equal to a maximum speed, and the method may further comprise filtering the PIG movement data by: identifying in the PIG movement data, and discarding, PIG movement data indicative of the PIG moving at a speed that is greater than the maximum speed.

Extracting the one or more signatures for each parameter may comprise, for each parameter: extracting a first signature by determining average values of the parameter as a function of position along the fluid conduit and as a function of time.

Extracting the one or more signatures for each parameter may comprise extracting a second signature by, for each parameter: determining diagonal differences of values of the parameter as a function of position along the fluid conduit and as a function of time; and determining, using the diagonal differences, a median of the diagonal differences relative to a set of predefined lines.

The method may further comprise, prior to determining the median of the diagonal differences, filtering the diagonal differences by discarding one or more diagonal differences that do no meet one or more slope requirements.

Extracting the one or more signatures for each parameter may comprise extracting a third signature by, for each parameter: determining diagonal differences of values of the parameter as a function of position along the fluid conduit and as a function of time; and for the determined diagonal differences of adjacent positions along the fluid conduit, determining a similarity of the determined diagonal differences; and based on the determined similarity, determining a mean of the determined diagonal differences.

The method may further comprise: identifying in the PIG movement data one or more portions of the fluid conduit for which no PIG movement data was generated; and updating the PIG movement data to include PIG movement data for the one or more portions of the fluid conduit for which no PIG movement data was generated, based on a speed of the PIG immediately prior to the PIG entering the one or more portions of the fluid conduit for which no PIG movement data was generated.

The method may further comprise: identifying, in the PIG movement data, one or more portions of data indicative of the PIG being stationary; and identifying, based on the one or more portions of data indicative of the PIG being stationary, one or more portions of the fluid conduit as requiring investigation.

The method may further comprise: identifying, using the PIG movement data, one or more portions of data associated with the PIG moving past one or more fluid conduit joints; and determining, based on the one or more portions of data associated with the PIG moving past one or more fluid conduit joints, a position of the PIG as a function of time in one or more portions of the fluid conduit not positioned along the one or more sensors.

The one or more portions of data associated with the PIG moving past one or more fluid conduit joints may comprise low-frequency signals, such as signals having a frequency of less than about 100 Hz.

The method may further comprise: determining one or more slopes associated with the PIG movement data; comparing the one or more determined slopes to one or more preset slopes; and filtering the PIG movement data based on the comparison of the one or more determined slopes to the one or more preset slopes.

Comparing the one or more determined slopes to the one or more preset slopes may comprise comparing one or both of a magnitude and a direction of the one or more determined slopes to one or both of a magnitude and a direction of the one or more preset slopes.

The method may further comprise: determining, based on the PIG movement data, acoustic magnitude data associated with one or more low-frequency signals generated by movement of the PIG; and filtering the PIG movement data based on the acoustic magnitude data.

Determining the acoustic magnitude data may comprise determining power spectral density data based on the PIG movement data. Filtering the PIG movement data may comprise filtering the PIG movement data based on one or more frequency bands of interest in the power spectral density data.

The one or more frequency bands of interest may comprise a frequency band from 10 Hz to 100 Hz.

Determining the acoustic magnitude data may comprise applying one or more filters to the one or more signals detected by the one or more sensors Filtering the PIG movement data may comprise: identifying, within the acoustic magnitude data, one or more of: a number of low-frequency spikes; and a flatness parameter; and filtering the PIG movement data based respectively on one or more of: the number of low-frequency spikes; and the flatness parameter.

Filtering the PIG movement data based on the one or more of the number of low-frequency spikes and the flatness parameter may comprise: comparing one or more of: the number of low-frequency spikes to a preset number of low-frequency spikes; and the flatness parameter to a preset flatness parameter; and filtering the PIG movement data based on one or more of the comparison of the number of low-frequency spikes to the preset number of low-frequency spikes and the comparison of the flatness parameter to the preset flatness parameter.

Identifying the number of low-frequency spikes may comprise: identifying spikes within the acoustic magnitude data; determining one or more of: for each spike, a prominence of the spike; one or more distances separating the spikes; and for each spike, a height of the spike; and determining the number of low-frequency spikes based on one or more of the determined prominence of each spike, the one or more distances separating the spikes, and the height of each spike.

The method may further comprise: displaying on a display, based on the PIG movement data, a position of the PIG relative to the pipeline.

According to a further aspect of the disclosure, there is provided a method of displaying a position of a pipeline inspection gauge (PIG) relative to a fluid conduit, comprising: while the PIG is moving through the fluid conduit, using one or more sensors positioned along the fluid conduit to determine a position of the PIG relative to a pipeline; and displaying, on a display, the position of the PIG relative to the pipeline.

According to a further aspect of the disclosure, there is provided a system comprising: a fluid conduit; one or more sensors positioned along the fluid conduit; and one or more processors and computer-readable medium storing computer program code configured when executed by the one or more processors to cause the one or more processors to perform a method comprising: when a Pipeline Inspection Gauge (PIG) is moving through the fluid conduit, receive interferometric data generated by the one or more sensors detecting one or more signals; extract parameter data from the interferometric data, wherein the parameter data comprises values of one or more parameters as a function of position along the fluid conduit and as a function of time; and generate, using the parameter data, PIG movement data indicative of a position of the PIG in the fluid conduit as a function of time.

According to a further aspect of the disclosure, there is provided a system comprising: a fluid conduit; one or more lengths of optical fiber positioned along the fluid conduit, each length of optical fiber comprising one or more Fiber Bragg Gratings (FBGs); an interrogator optically coupled to the one or more lengths of optical fiber and configured to interrogate the one or more lengths of optical fiber by transmitting one or more light pulses along the one or more lengths of optical fiber and detect reflections of the one or more light pulses from the FBGs; and one or more processors and computer-readable medium storing computer program code configured when executed by the one or more processors to cause the one or more processors to perform a method comprising: when a Pipeline Inspection Gauge (PIG) is moving through the fluid conduit, cause the interrogator to interrogate the one or more lengths of optical fiber and receive reflections of the light pulses; generate interferometric data from the received reflections; extract parameter data from the interferometric data, wherein the parameter data comprises values of one or more parameters as a function of position along the fluid conduit and as a function of time; and generate, using the parameter data, PIG movement data indicative of a position of the PIG in the fluid conduit as a function of time.

According to a further aspect of the disclosure, there is provided a computer-readable medium storing computer program code configured when executed by one or more processors to cause the one or more processors to perform a method comprising: obtaining interferometric data of a Pipeline Inspection Gauge (PIG) moving along a fluid conduit; extracting parameter data from the interferometric data, wherein the parameter data comprises values of one or more parameters as a function of position along the fluid conduit and as a function of time; and generating, using the parameter data, PIG movement data indicative of a position of the PIG in the fluid conduit as a function of time.

According to a further aspect of the disclosure, there is provided a system comprising: a fluid conduit; one or more sensors positioned along the fluid conduit; and one or more processors and computer-readable medium storing computer program code configured when executed by the one or more processors to cause the one or more processors to perform a method comprising: while the PIG is moving through the fluid conduit, obtain from the one or more sensors a position of the PIG relative to a pipeline; and cause to display, on a display, the position of the PIG relative to the pipeline.

BRIEF DESCRIPTION OF THE DRAWINGS

Embodiments of the disclosure will now be described in detail in conjunction with the accompanying drawings of which.

DETAILED DESCRIPTION

The present disclosure seeks to provide improved methods and systems for tracking movement of a PIG within a fluid conduit. While various embodiments of the disclosure are described below, the disclosure is not limited to these embodiments, and variations of these embodiments may well fall within the scope of the disclosure which is to be limited only by the appended claims.

Generally, according to embodiments of the disclosure, there are described methods and systems for tracking movement of a PIG within a fluid conduit, such as a pipeline. According to some embodiments, while the PIG is moving through the fluid conduit, one or more sensors positioned along the fluid conduit are used to detect one or more signals, such as acoustic signals and strain signals. For example, optical fiber may be used to obtain interferometric data (which may comprise phase data) from one or more signals detected as the PIG moves through the fluid conduit. Parameter data is then extracted from the one or more signals. For example, the interferometric data may be processed to generate data relating to one or more parameters of the one or more signals as a function of time and position along the fluid conduit. The parameters may include, for example, strain, magnitude, and a power ratio of different frequency bands. The parameter data is then processed to generate PIG movement data. The PIG movement data may be indicative of a position of the PIG in the fluid conduit as a function of time.

Fiber optic cables are often used as distributed measurement systems in acoustic sensing applications. Pressure changes, due to sound waves for example, in the space immediately surrounding an optical fiber and that encounter the optical fiber cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Figure 1A:
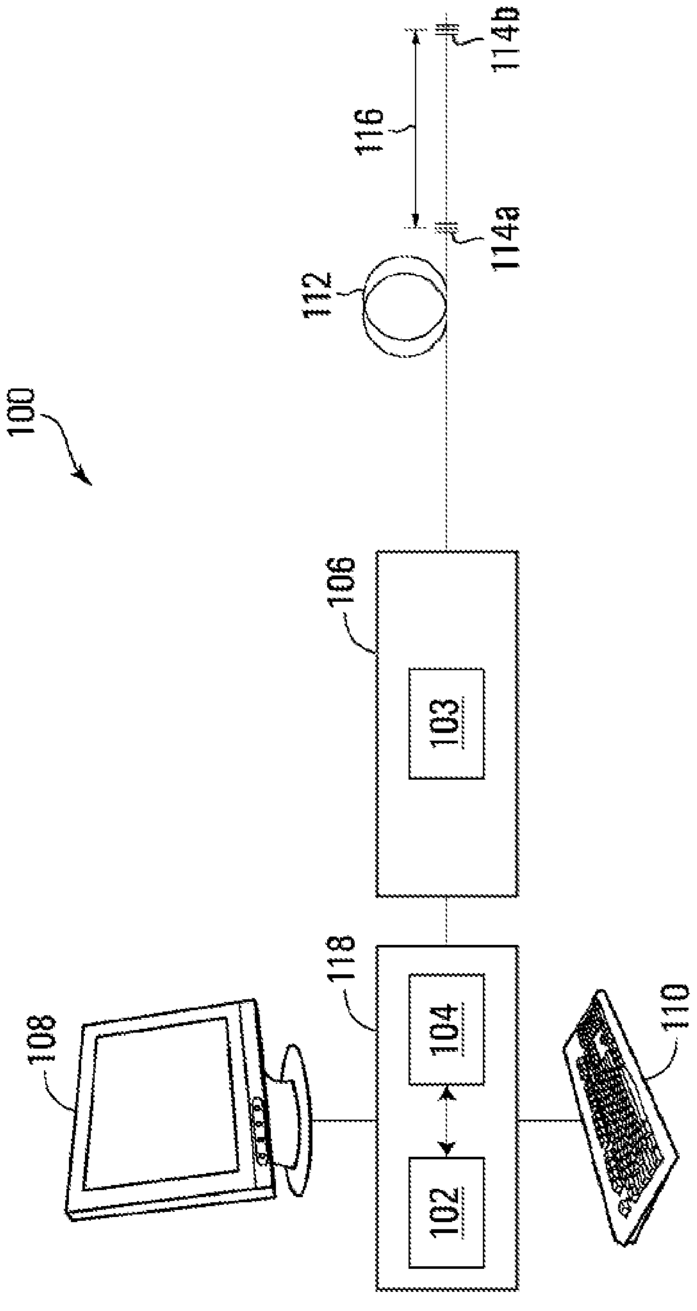
FIG. 1A is a block diagram of a system for determining whether an event has occurred from dynamic strain measurements, which includes an optical fiber with fiber Bragg gratings ("FBGs") for reflecting a light pulse, in accordance with embodiments of the disclosure.

Referring now to FIG. 1A, there is shown one embodiment of a system 100 for performing interferometry using fiber Bragg gratings ("FBGs"), in accordance with embodiments of the disclosure. The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous SiO2). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114*a,b* (generally, "FBGs 114"). The first and second FBGs 114*a,b* are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114*a,b* and return to the interrogator 106. The delay between transmission of the sensing and reference pulses is such that the reference pulse that reflects off the first FBG 114*a* (hereinafter the "reflected reference pulse") arrives at the optical receiver 103 simultaneously with the sensing pulse that reflects off the second FBG 114*b* (hereinafter the "reflected sensing pulse"), which permits optical interference to occur.

While FIG. 1A shows only the one pair of FBGs 114*a,b,* in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114*a,b* interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with control module 250. The computer-readable medium 104 has stored on it program code to cause control module 250 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. Control module 250 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, control module 250 may apply a high-pass filter with a cut-off frequency of 20 Hz. Control module 250 may also apply more complex signal processing methods to the output signal; example methods include those described in PCT application PCT/CA2012/000018 (publication number WO 2013/102252), the entirety of which is hereby incorporated by reference.

Figure 1B:
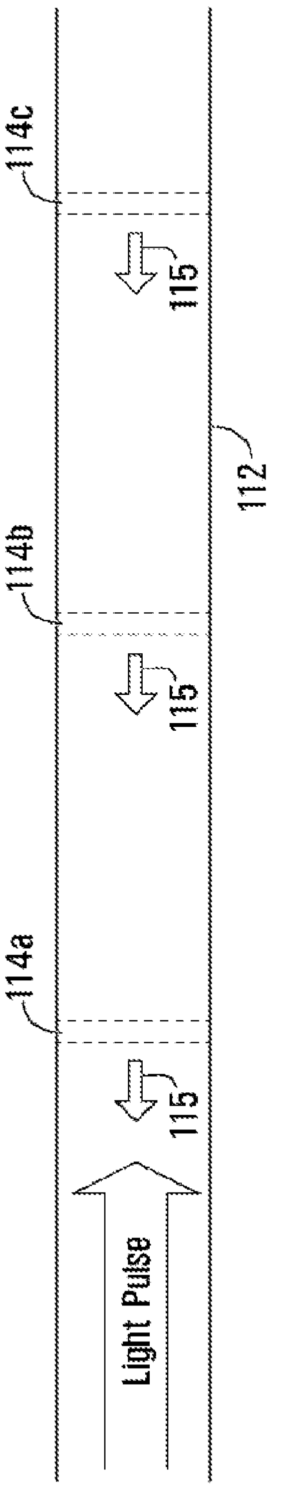
FIG. 1B is a schematic diagram that depicts how the FBGs reflect a light pulse, in accordance with embodiments of the disclosure.

FIG. 1B depicts how the FBGs 114 reflect the light pulse, according to another embodiment in which the optical fiber 112 comprises a third FBG 114*c*. In FIG. 1B, the second FBG 114*b* is equidistant from each of the first and third FBGs 114*a,c* when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114*a,b* can reflect off the third FBG 114*c* and any subsequent FBGs 114, resulting in interferometry that can be used to detect strain along the fiber 112 occurring further from the interrogator 106 than the second FBG 114*b*. For example, in the embodiment of FIG. 1B, a portion of the sensing pulse not reflected by the first and second FBGs 114*a,b* can reflect off the third FBG 114*c*, and a portion of the reference pulse not reflected by the first FBG 114*a* can reflect off the second FBG 114*b*, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\Theta=2\pi nL/\lambda,$$

where n is the index of refraction of the optical fiber, L is the physical path length of the fiber segment 116, and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 1C:
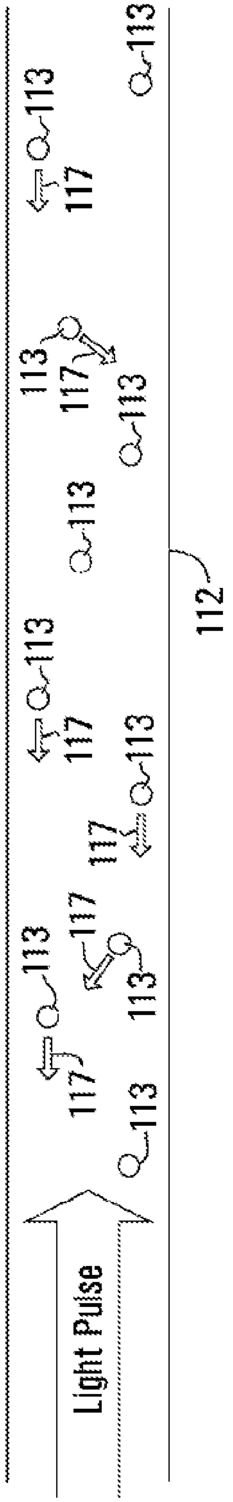
FIG. 1C is a schematic diagram that depicts how a light pulse interacts with impurities in an optical fiber that results in scattered laser light due to Rayleigh scattering, which is used for distributed acoustic sensing ("DAS"), in accordance with embodiments of the disclosure.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
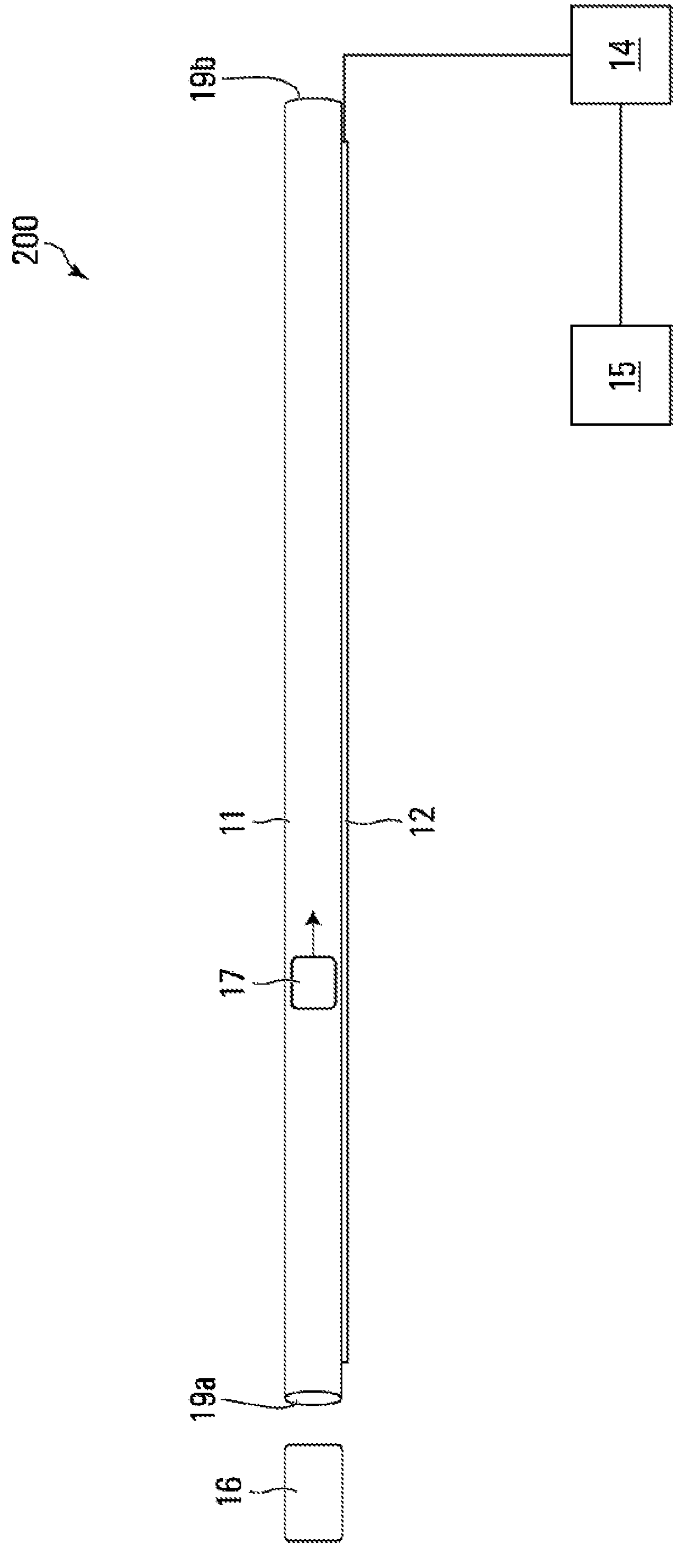
FIG. 2 is a schematic diagram of an optical interrogation system in accordance with embodiments of the disclosure.

Referring now to FIG. 2, there is shown an optical interrogation system 200 (similar to system 100) that may be used to track movement of a PIG in a pipeline, in accordance with embodiments of the disclosure. FIG. 2 shows a pipeline 11 alongside which is provided a length of optical fiber 12. For example, optical fiber 12 may be attached to pipeline 11. FBGs (not shown), as described above, are provided along the length of optical fiber 12 for reflecting light transmitted along optical fiber 12. In some embodiments, optical fiber 12 may comprise multiple individual interconnected lengths of optical fiber. Pipeline 11, or portions of pipeline 11, may be suspended above ground level by using one or more supports as known in the art. Alternatively, pipeline 11, or portions of pipeline 11, may be partially or wholly buried.

Optical fiber 12 is optically coupled to an interrogator 14. Interrogator 14 is configured to interrogate optical fiber 12 using optical fiber interferometry, as described above. Interrogator 14 is communicatively coupled to a control module 15. Control module 15 comprises one or more processors and one or more memories comprising computer program code executable by the one or more processors and configured, when executed by the one or more processors, to cause the one or more processors to process phase data obtained by interrogator 14 from interferences between light pulses transmitted along optical fiber 12. In some embodiments, control module 15 may be comprised within interrogator 14 such that interrogator 14 may perform the functions of control module 15.

Optical fiber 12 is divided into a number of channels or portions of optical fiber. In order to distinguish between different channels, interrogator 14 may employ techniques known in the art such as time division multiplexing (TDM) or wavelength division multiplexing (WDM), or a combination of both, as described above. For instance, in the context of WDM, different pulses having different wavelengths may be transmitted along optical fiber 12. Each channel of optical fiber 12 may be provided with FBGs configured to reflect light having a certain wavelength. Depending on the wavelength of the reflections received from optical fiber 12, interrogator 14 may determine from which channel the reflections originated from.

At one end of pipeline 11 is provided a PIG launcher 16. PIG launcher 16 is operable to launch one or more PIGs into pipeline 11, whereupon the PIGs are moved along the length pipeline 11 by the flow of fluid within pipeline 11. As can be seen in FIG. 2, a PIG 17 is moving from a first end 19*a* of pipeline 11 to a second end 19*b* of pipeline 11.

As will now be described in further detail, control module 15, interrogator 14, and optical fiber 12 may be used to generate and analyze acoustic data (typically in the range of about 10 Hz to about 40 kHz) from pipeline 11 as PIG 17 moves along pipeline 11. The data may be processed to track PIG 17 as PIG 17 moves along pipeline 11, by determining or otherwise estimating a position of PIG 17 as a function of time elapsed since the launch of PIG 17. Such data may be used, for example, to determine when PIG 17 is likely to exit pipeline 11 via end 19*b*, or else may be used to determine a likely position of PIG 17 within pipeline 11 in the event that PIG 17 becomes stuck within pipeline 11.

Figure 3:
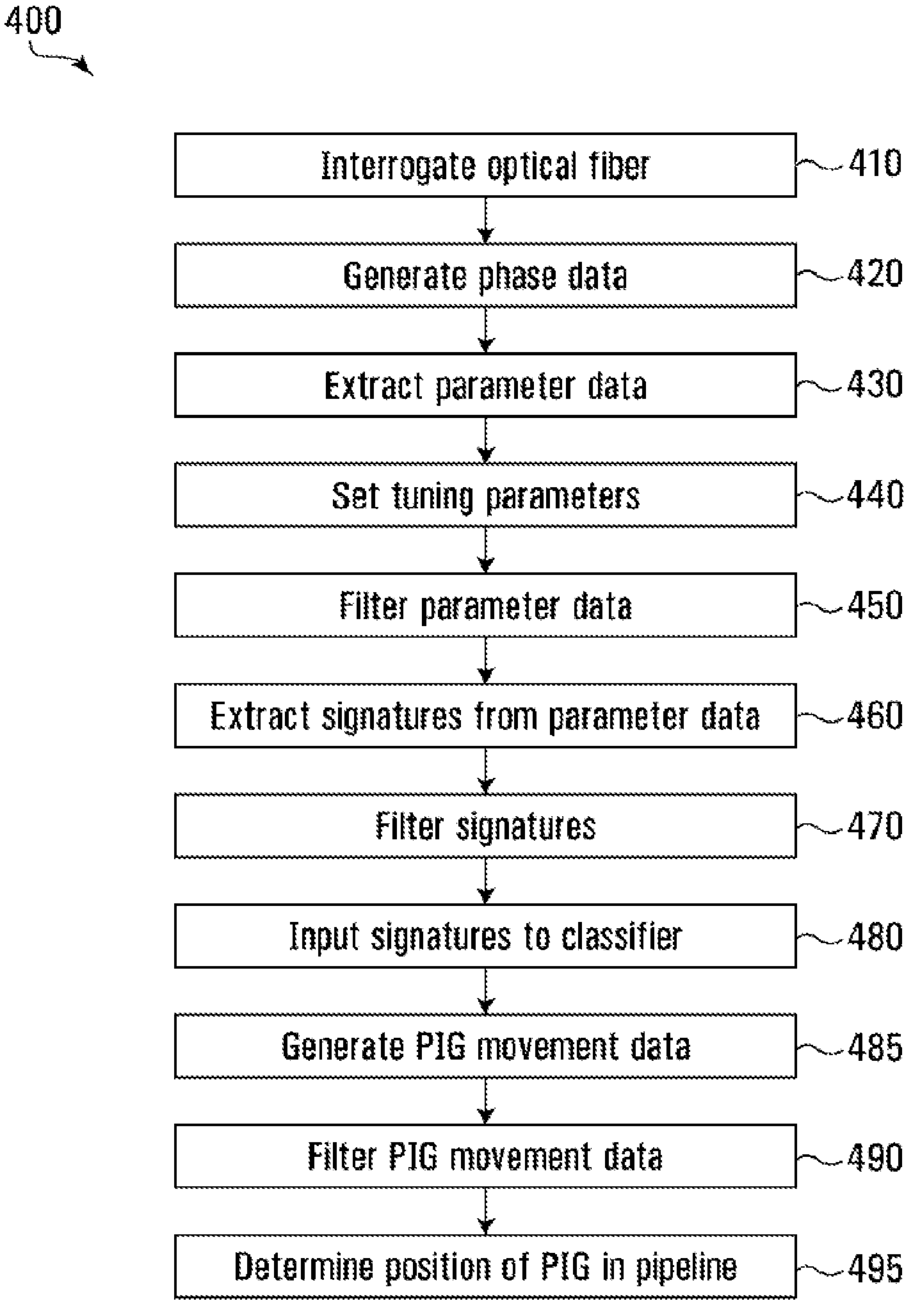
FIG. 3 is a flow diagram of a method of tracking a PIG moving through a fluid conduit, according to an embodiment of the disclosure.

Turning to FIG. 3, there is shown a method of tracking PIG 17 as PIG 17 moves through pipeline 11. At block 410, interrogator 14 interrogates optical fiber 12 by transmitting light pulses along optical fiber 12, and detecting reflections of the light pulses from the FBGs positioned along optical fiber 12. Differences in phase between the transmitted and reflected pulses may be due to the result of acoustic or strain signals interfering with the transmitted and reflected pulses. At block 420, control module 15 generates phase data from the detected reflections. At block 430, control module 15 extracts parameter data from the generated phase data. Suitable methods of parameter extraction are described in more detail in international patent publication WO 2017/147679, the contents of which is hereby incorporated by reference in its entirety.

Figure 4A:
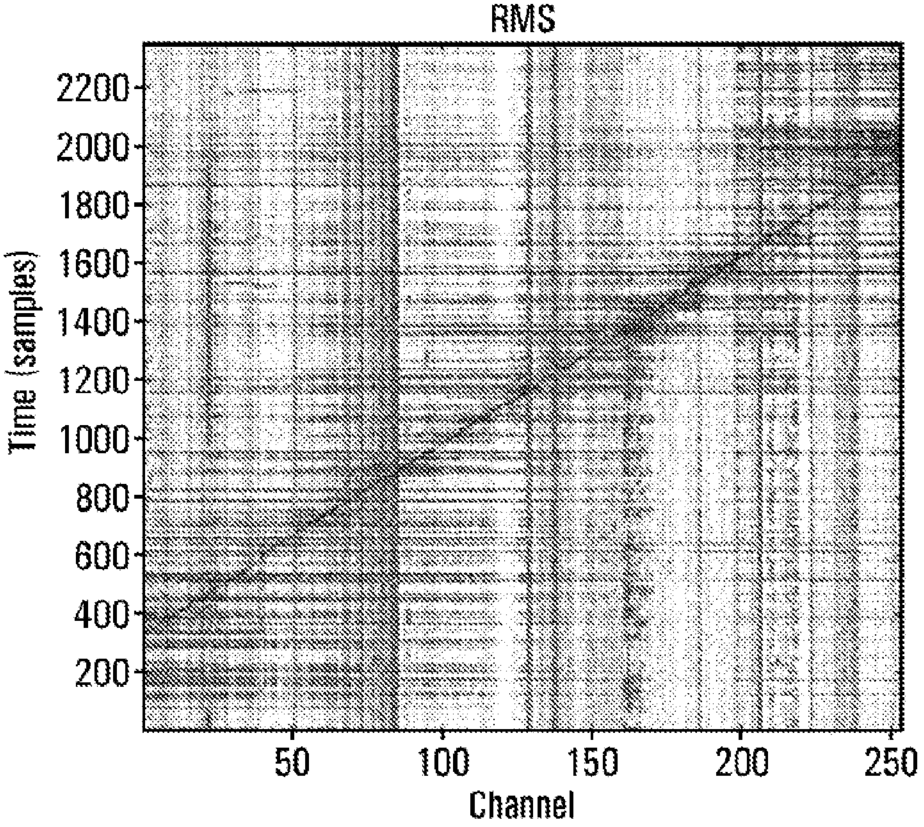
FIGS. 4A and 4B are plots of the parameters RMS and MHFreqPR as a function of channel and time, according to an embodiment of the disclosure.
Figure 4B:
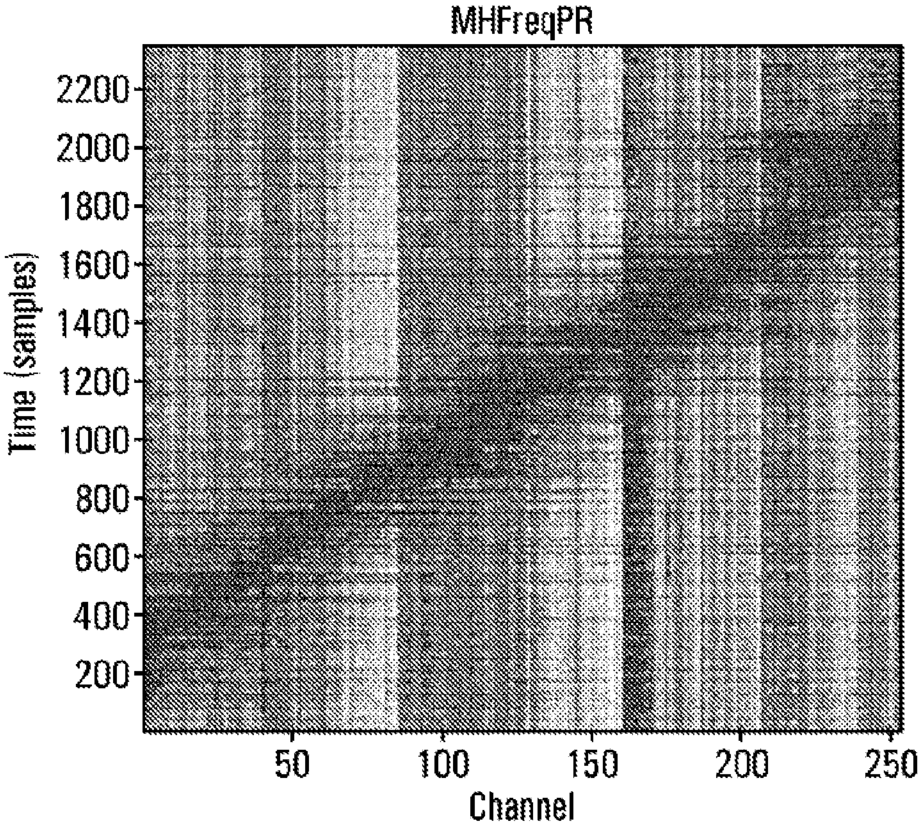

The parameter data comprises one or more parameters of the detected acoustic signals as a function of time and position along pipeline 11. The one or more parameters may include, for example, strain, root mean square (RMS) magnitude, and a ratio of a power of the acoustic signals in a mid-range frequency band to a power of the acoustic signals in a high-range frequency (which may be referred as "MHFreqPR"). The mid-range frequency band may be from about 100 Hz to about 300 Hz, and the high-range frequency band may be from about 3 kHz to about 4 kHz. FIG. 4A shows a plot of the RMS of acoustic signals as a function of time and optical fiber channel. FIG. 4B shows a plot of MHFreqPR of acoustic signals as a function of time and optical fiber channel. The parameter MHFreqPR tends to highlight portions of the acoustic signature of the PIG that are in the mid-range frequency band, as distinct from the low-frequency band which may be heavily impacted by flow and acoustics from outside the pipe (e.g. from pumps), as well as higher frequency bands which may be impacted by system noise and other sources.

At block 440, control module 15 receives one or more tuning parameters. The tuning parameters may include, for example, the direction in which PIG 17 is travelling, minimum and maximum speed thresholds for PIG 17, local and global baseline thresholds, and processing window sizes. The tuning parameters may be site-specific and may be based on each site's available baselining and PIG data.

Figure 5A:
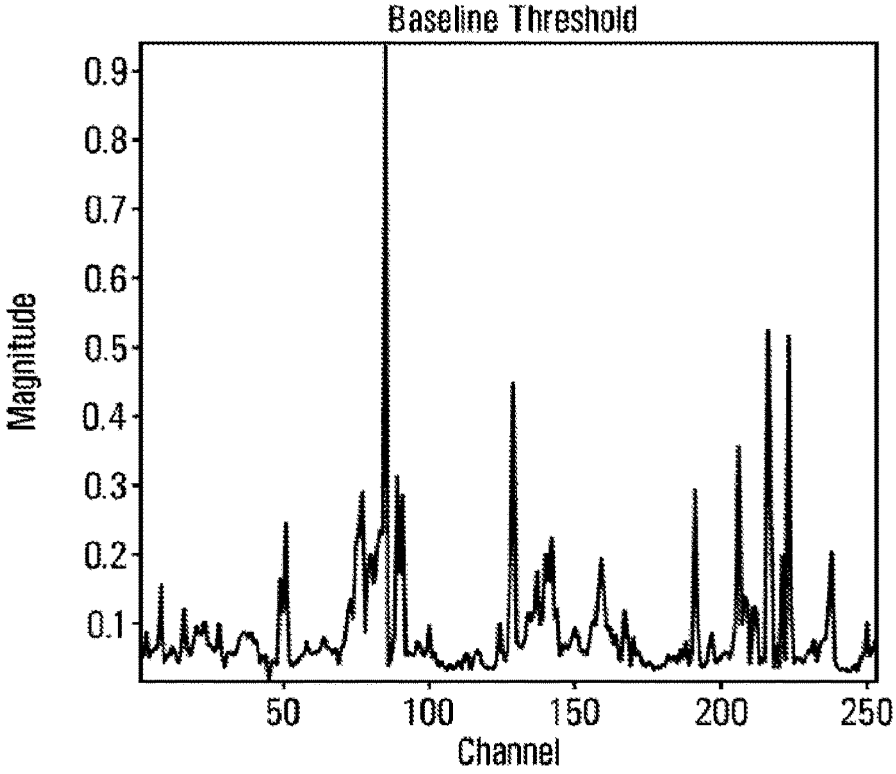
FIGS. 5A and 5B are plots of baseline thresholds for, respectively, the parameters RMS and MHFreqPR of FIGS. 4A and 4B, according to an embodiment of the disclosure.
Figure 5B:
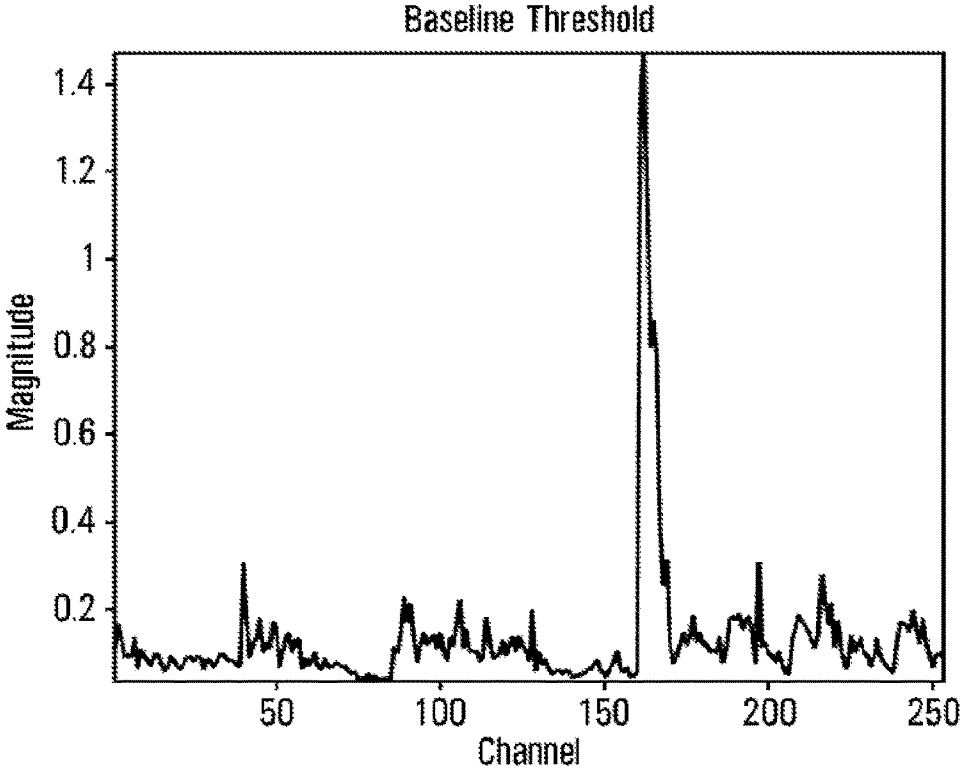

At block 450, the parameter data is filtered. The parameter data may be filtered using one or more of the local and global baseline thresholds set at block 440, including a combination of one or more local baseline thresholds and the global baseline threshold. A baseline threshold may refer to a threshold below which parameter data may be discarded, with only parameter data meeting or exceeding the threshold being used for subsequent data processing. The purpose of the filtering is to exclude parameter data that is clearly unrelated to movement of PIG 17. For example, ambient noise or other external noise sources may generate acoustic signals that are unrelated to movement of PIG 17. During a baselining process prior to the launching of PIG 17 within pipeline 11, the baseline thresholds may be established by interrogating optical fiber 12 and determining a baseline level of acoustic noise (e.g. a global baseline) for pipeline 11 as a whole, and/or baseline levels of acoustic noise for individual channels of optical fiber 12 (e.g. local baselines), each channel corresponding to a different portion of pipeline 11. Thus, different baseline thresholds may be applied to different channels. For example, a channel that is adjacent a pump will experience a higher level of ambient noise than a channel that is further removed from the pump. Therefore, a higher baseline threshold should be applied to the parameter data corresponding to the channel adjacent the pump. FIG. 5A shows different baseline thresholds applied to the parameter data of FIG. 4A, with the resulting filtered data being shown in FIG. 6A. FIG. 5B shows different baseline thresholds applied to the parameter data of FIG. 4B, with the resulting filtered data being shown in FIG. 6B.

At block 460, control module 15 extracts, for each parameter contained in the parameter data, one or more features or signatures from the filtered parameter data. According to some embodiments, the extracted signatures include a windowed mean or median of the parameter, a best fit of the parameter to a predetermined set of sloped lines, and a mean of similar slopes for neighbouring points.

The windowed mean or median of the parameter (i.e. the first signature) is determined based on the filtered parameter data obtained at the output of block 450, without further processing.

Figure 6A:
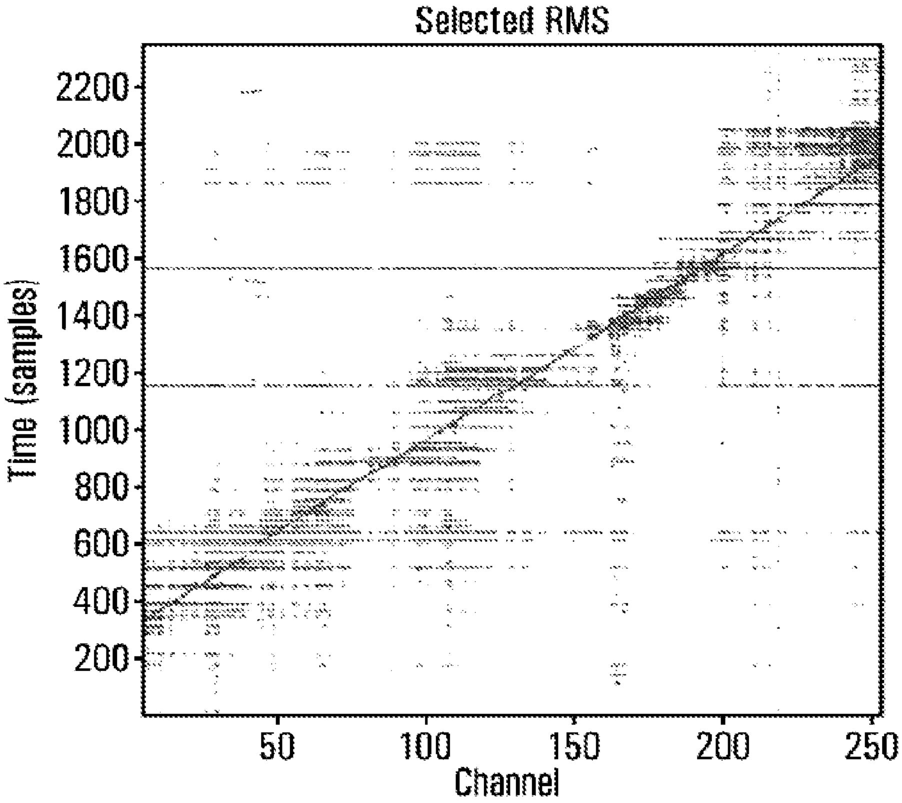
FIGS. 6A and 6B are plots of the parameters RMS and MHFreqPR filtered using the baseline thresholds of FIGS. 5A and 5B, according to an embodiment of the disclosure.
Figure 6B:
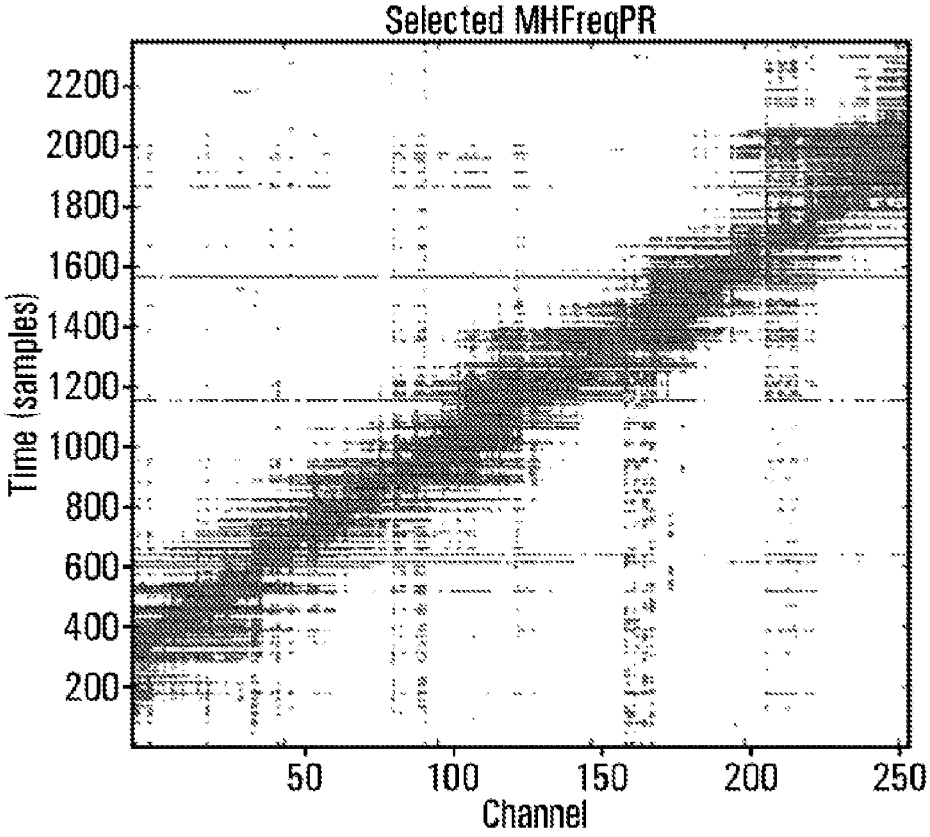
Figure 7A:
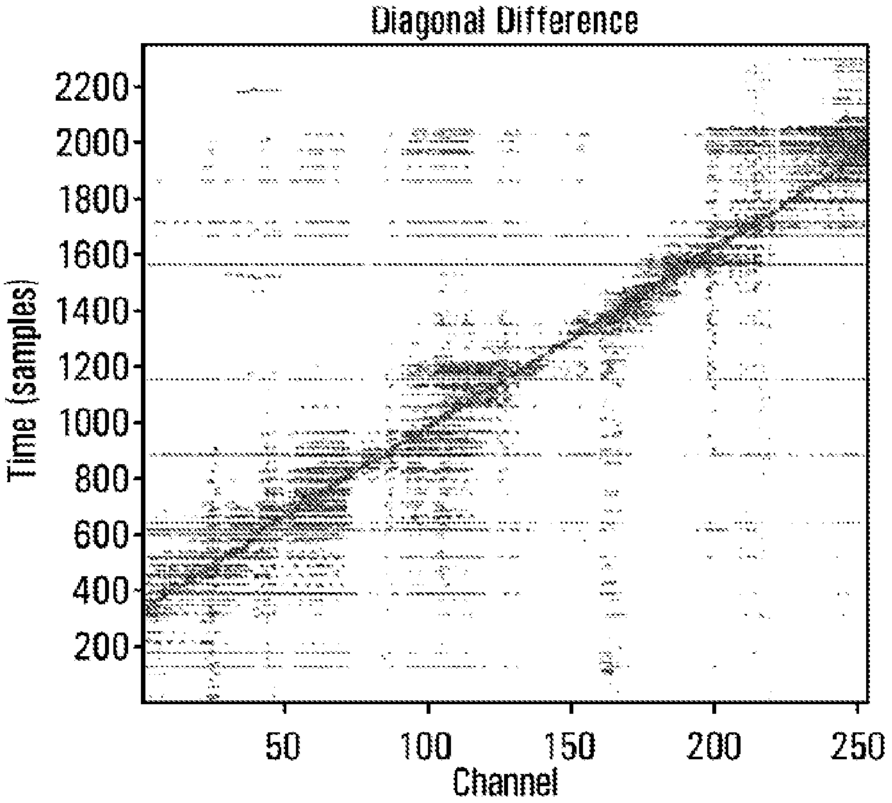
FIGS. 7A and 7B are plots of diagonal differences of the filtered parameters RMS and MHFreqPR of FIGS. 6A and 6B, according to an embodiment of the disclosure.
Figure 7B:
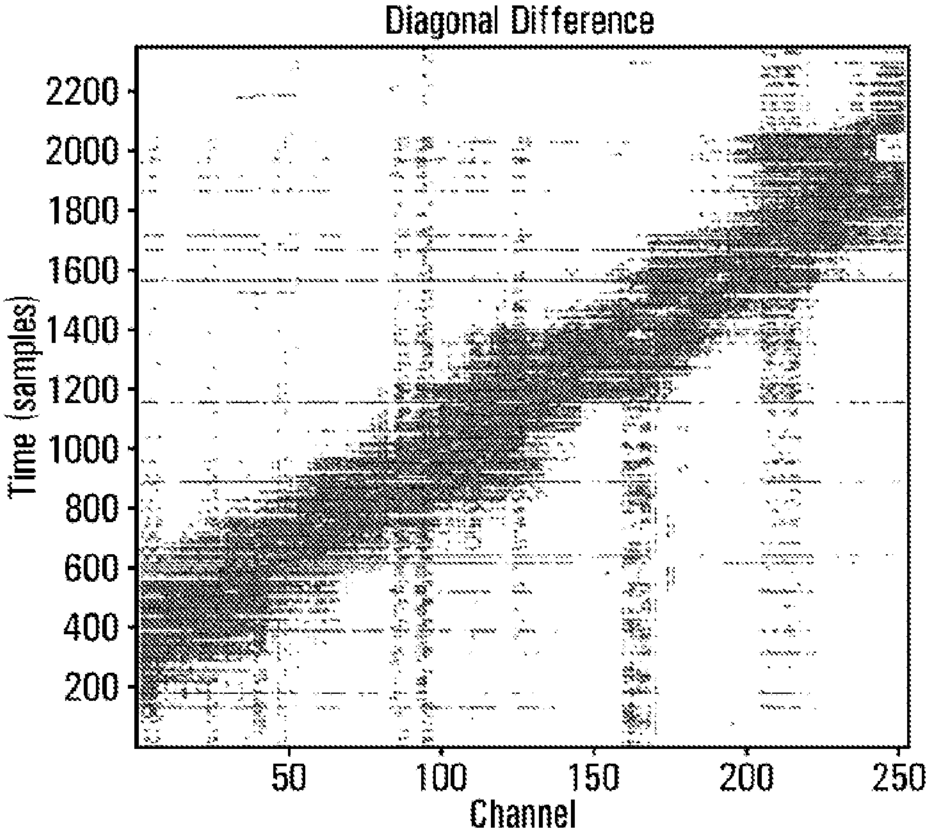
Figure 8A:
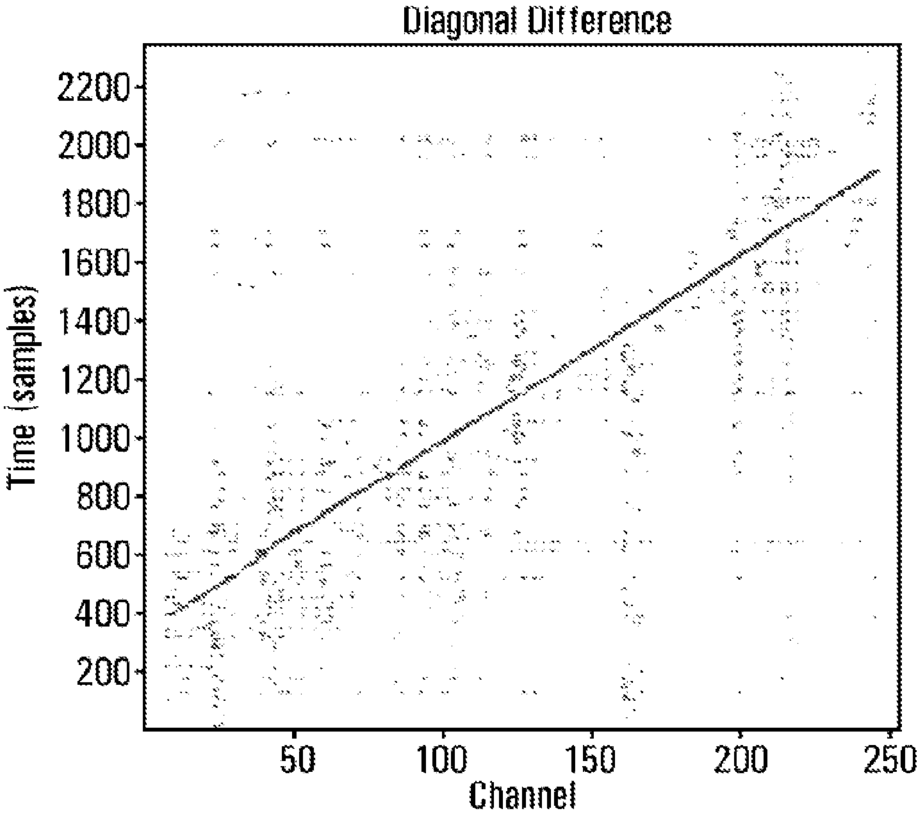
FIGS. 8A and 8B are plots of the diagonal differences of FIGS. 7A and 7B, after filtering, according to an embodiment of the disclosure.
Figure 8B:
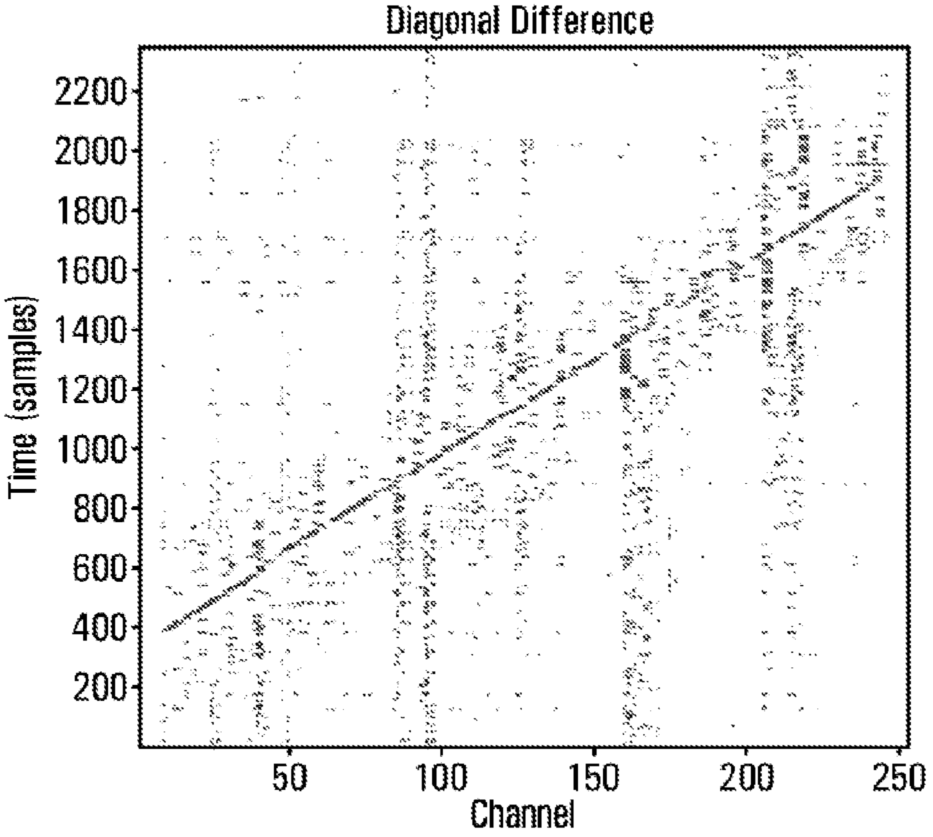

In order to determine the best fit of the parameter to the predetermined set of sloped lines (i.e. the second signature), control module 15 first determines diagonal difference data from the parameter data. The diagonal difference parameter emphasizes the edges of the line of interest, making it easier to fit sloped lines to it. FIG. 7A is a plot of diagonal difference data of the filtered parameter data of FIG. 6A, and FIG. 7B is a plot of diagonal difference data of the filtered parameter data of FIG. 7A. Control module 15 then filters the diagonal difference data by discarding diagonal differences that do meet one or more slope requirements. The slope requirements may be set according to the minimum and maximum speeds of PIG 17 as programmed at block 440. As a result of this filtering, data indicative of movement that is clearly too slow or too fast for PIG 17 may be discarded. For example, horizontal lines may be indicative of common mode system events, while lines with steep slopes may be indicative of faster moving vehicles. Any such lines may be filtered out on the basis that they do not meet the one or more slope requirements. Likewise, vertical lines may relate to stationary events such as system noise, pumps, etc., and may also be filtered out on the basis that they do not meet the one or more slope requirements. FIG. 8A shows the resulting filtered data for the diagonal difference data of FIG. 7A, and FIG. 8B shows the resulting filtered data for the diagonal difference data of FIG. 8A.

Figure 11:
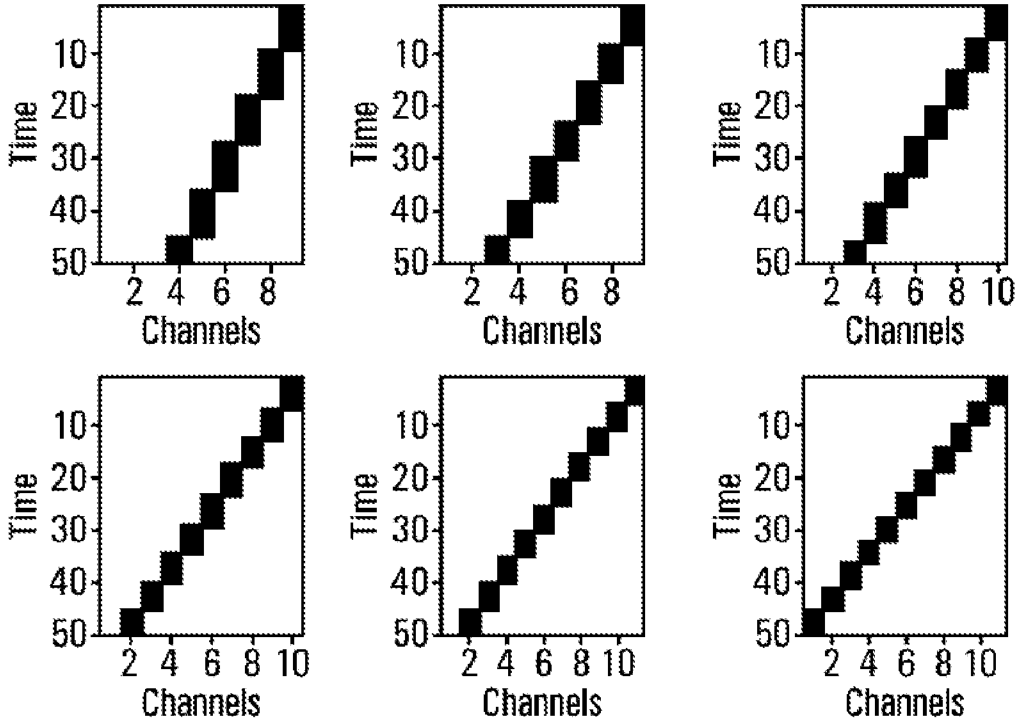
FIG. 11 are plots of lines having predefined slopes, according to an embodiment of the disclosure.
Figure 12A:
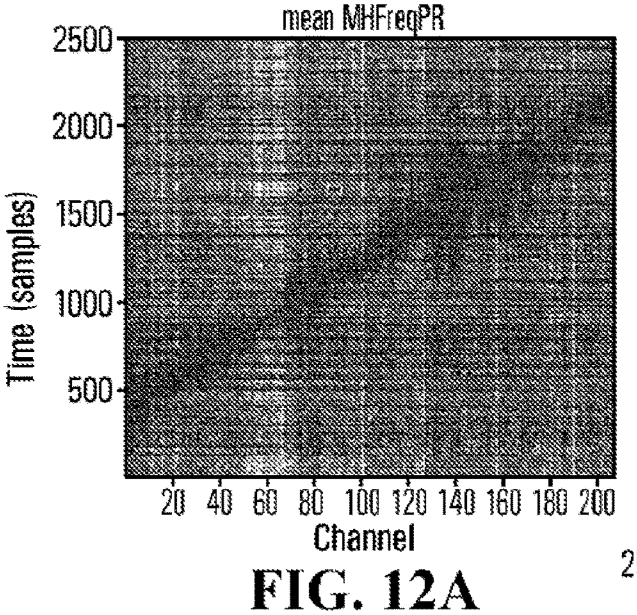
FIGS. 12A-12C are plots of mean MHFreqPR, mean RMS, and PIG movement, according to an embodiment of the disclosure.
Figure 12B:
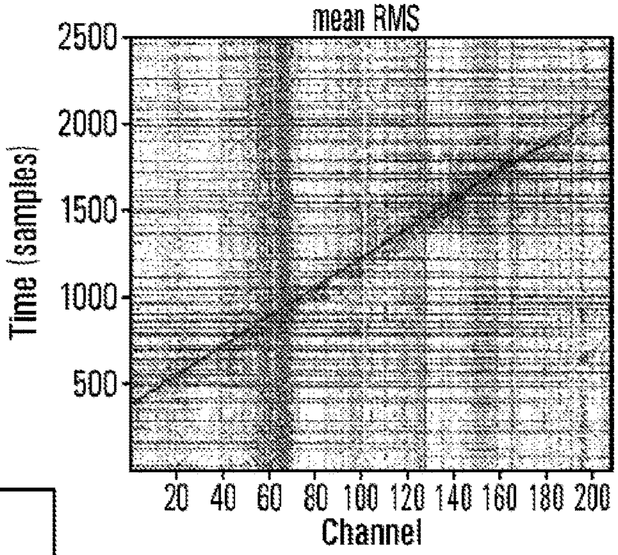
Figure 12C:
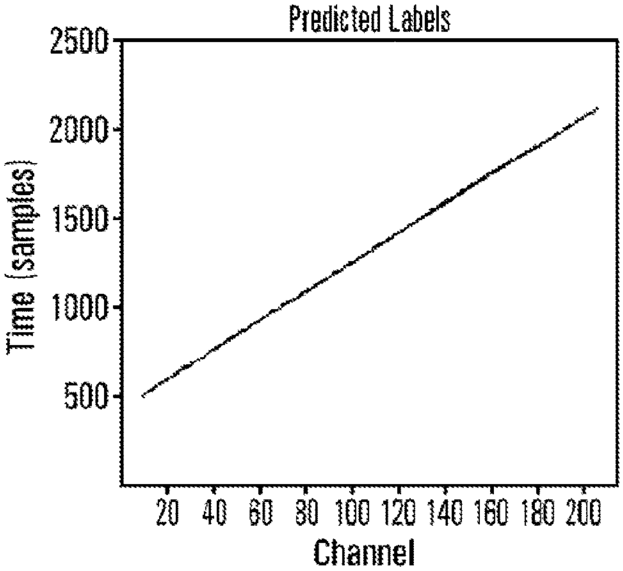

After filtering the diagonal difference data, the best fit of the filtered diagonal difference data to the predetermined set of sloped lines is determined. An example of a predetermined set of sloped lines is shown in FIG. 11. The predetermined set of sloped lines may be established based on, for example, an acceptable range of PIG speeds. The best fit of the filtered diagonal difference data to the set of predetermined sloped lines may be determined based on the median of the filtered diagonal difference data along each of the predetermined sloped lines. The median values from the diagonal difference values along the various sloped lines can be compared and the line with the maximum median value can be determined to have the closest fit to the direction of PIG movement.

In order to determine the mean of similar slopes for neighbouring points (i.e. the third signature), the similarity between the slopes of the best fit of the filtered diagonal difference data (as determined for the second signature) is determined for adjacent channels. For slopes that meet a minimum similarity threshold, the mean of the slopes is then determined and used as the third signature. This may be useful as the signature of a PIG can often be sensed in two or more adjacent channels at the same time, i.e. there can be multiple diagonal lines (starting or ending at different channels) representing the movement of the PIG in time and space.

Figure 9A:
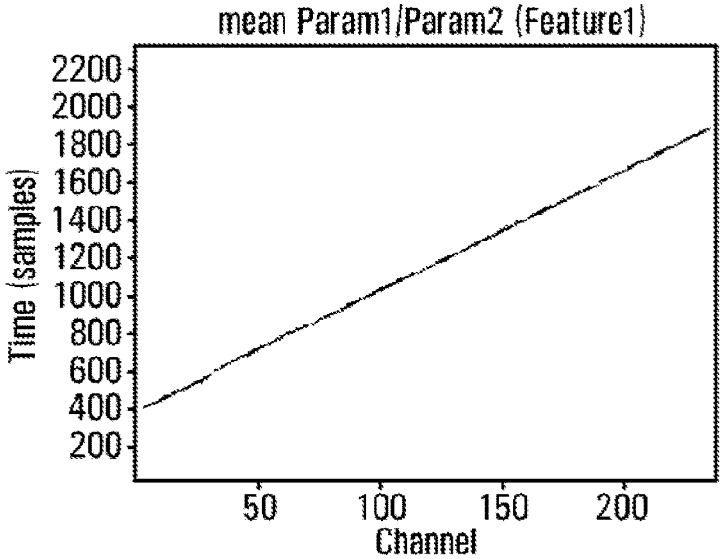
FIGS. 9A-9C are plots of features extracted from the plots of the parameters RMS and MHFreqPR of FIGS. 4A and 4B, according to an embodiment of the disclosure.
Figure 9B:
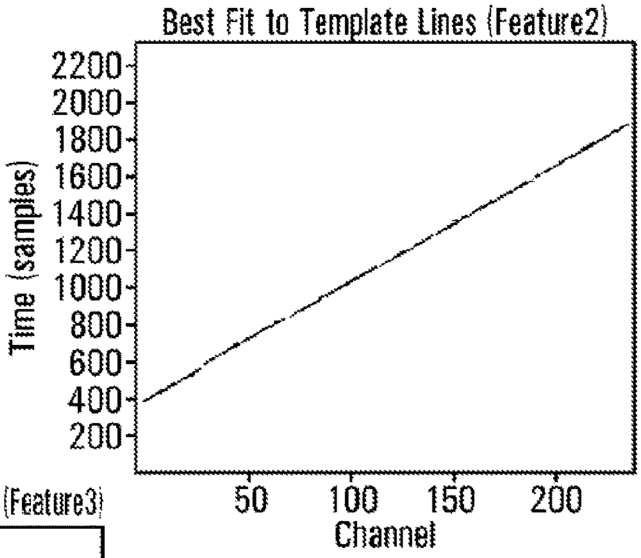
Figure 9C:
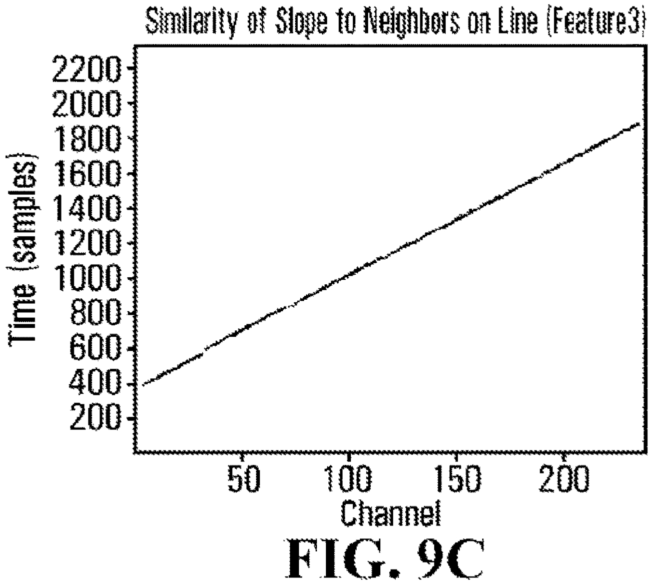

After having extracted the above three signature or features for each parameter contained in the parameter data, at block 470, control module 15 filters the signatures according to one or more preset filters. For example, the preset filters may relate to a direction of fluid flow in pipeline 11, and control module 15 may accordingly filter out any signature data indicative of PIG movement in a direction that is counter to the direction of fluid flow within pipeline 11. At block 480, the filtered signatures for a first one of the parameters are combined with the filtered signatures for a second one of the parameters. For example, according to some embodiments, the filtered signatures for strain and MHFreqPR are combined. According to some embodiments, the filtered signatures for RMS and MHFreqPR are combined. According to some embodiments, the filtered signatures for strain and MHFreqPR may be combined for certain sections of the pipe, and the filtered signatures for RMS and MHFreqPR may be combined for other sections of the pipe. According to some embodiments, combining the filtered signatures for one parameter with those of another parameter may comprise normalizing the filtered signatures for each parameter, and then determining a mean of the normalized filtered signatures. FIGS. 9A-9C show the combined signatures (i.e. the mean of the normalized filtered signatures) for the parameters RMS and MHFreqPR, based on the plots shown in FIGS. 4A and 4B.

At block 480, the combined signatures are input to a signature classifier. The classifier may comprise any suitable trained machine learning model, such as a Support Vector Machine (SVM). The classifier may be trained using any various known techniques in the art. For example, according to some embodiments, numerous example datasets of signatures confirmed as relating to or not relating to movement of a PIG in pipeline 11 are input to the classifier in order to train the classifier. The example datasets may be obtained by interrogating pipeline 11 using interrogator 14, as described above, when a PIG is moving through pipeline 11.

Figure 10:
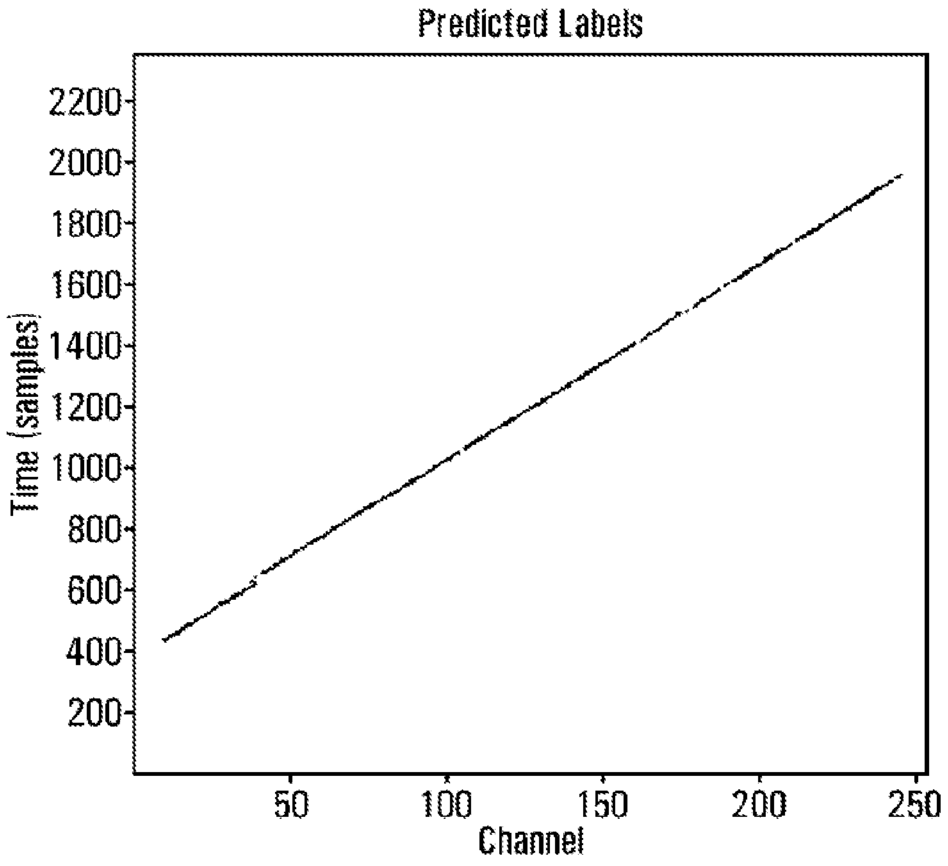
FIG. 10 is a plot of PIG movement according to an embodiment of the disclosure.

At block 485, the classifier generates PIG movement data indicative of a position of PIG 17 in pipeline 11 as a function of time. FIG. 10 shows an example of PIG movement data indicative of a position of PIG 17 in pipeline 11 as a function of time. The slope of the diagonal line indicates the speed of PIG 17 for a given position (i.e. channel) within pipeline 11.

Figure 13A:
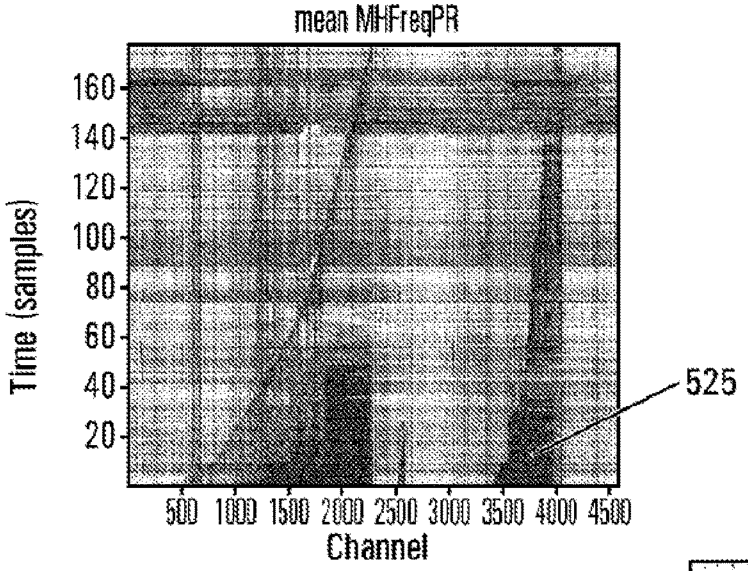
FIGS. 13A-13C are plots of mean MHFreqPR, mean RMS, and PIG movement, according to an embodiment of the disclosure.
Figure 13B:
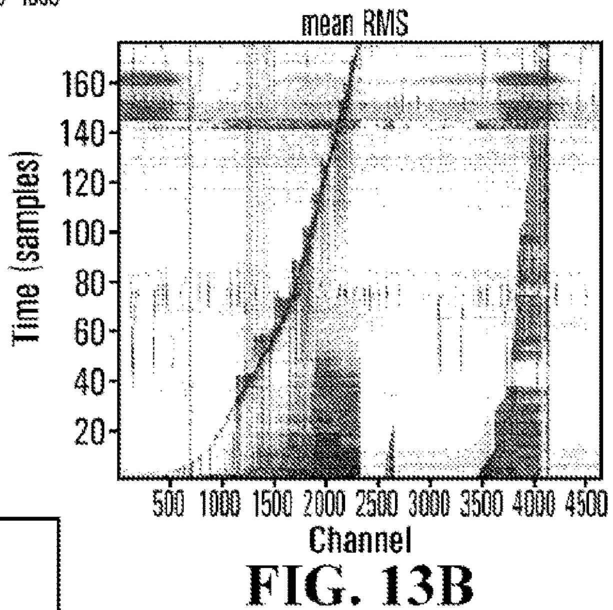
Figure 13C:
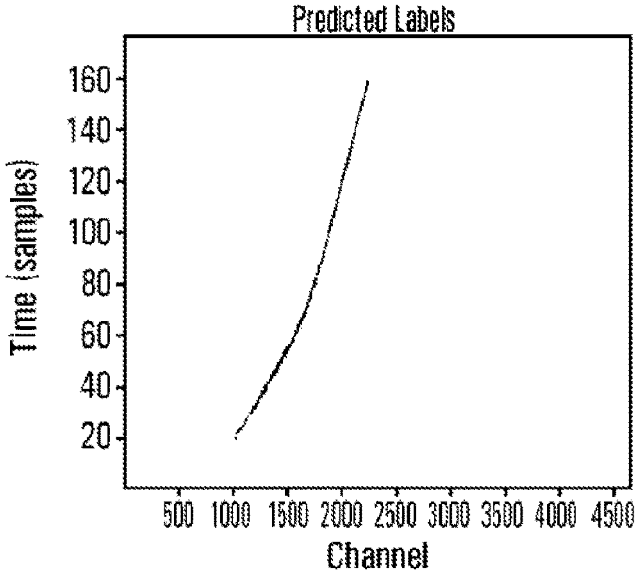
Figure 14A:
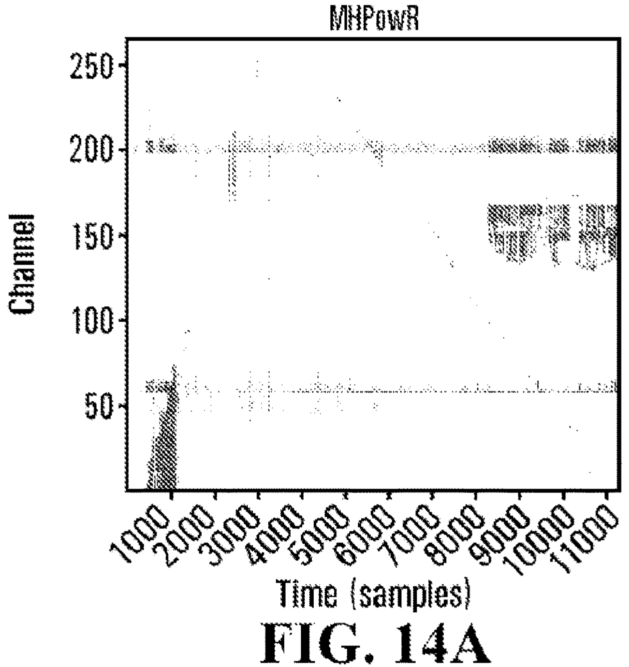
FIGS. 14A-14C are plots of mean MHFreqPR, mean RMS, and PIG movement, according to an embodiment of the disclosure.
Figure 14B:
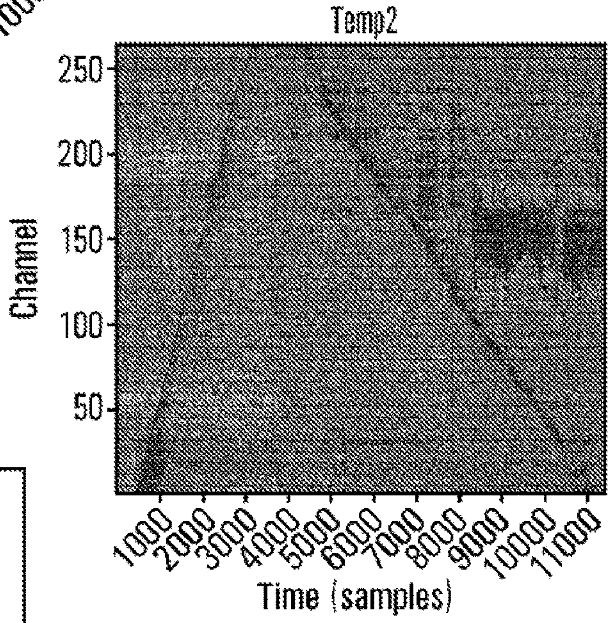
Figure 14C:
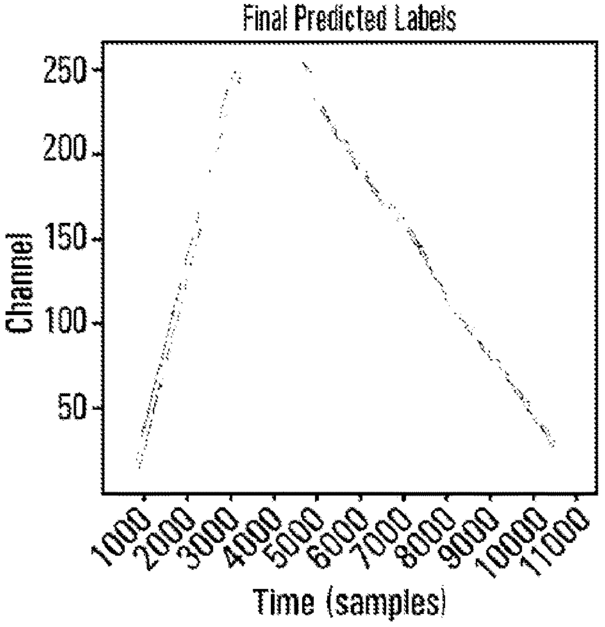
Figure 15A:
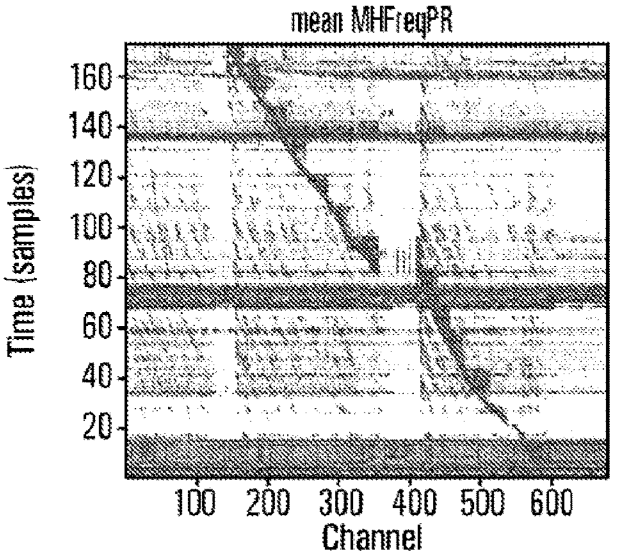
FIGS. 15A-15C are plots of mean MHFreqPR, mean RMS, and PIG movement, according to an embodiment of the disclosure.
Figure 15B:
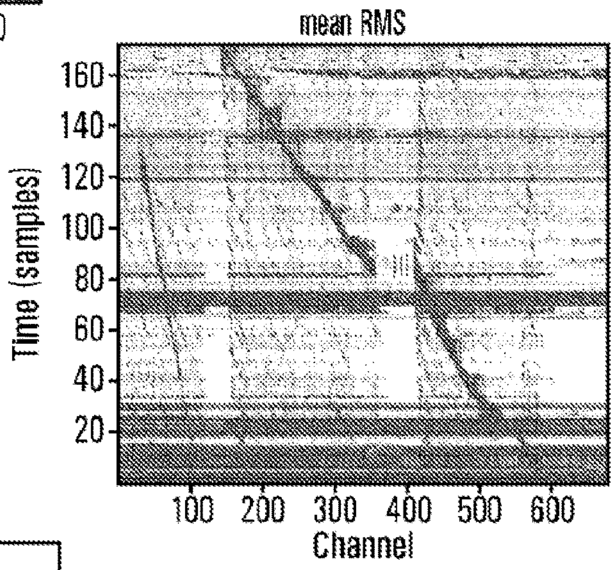
Figure 15C:
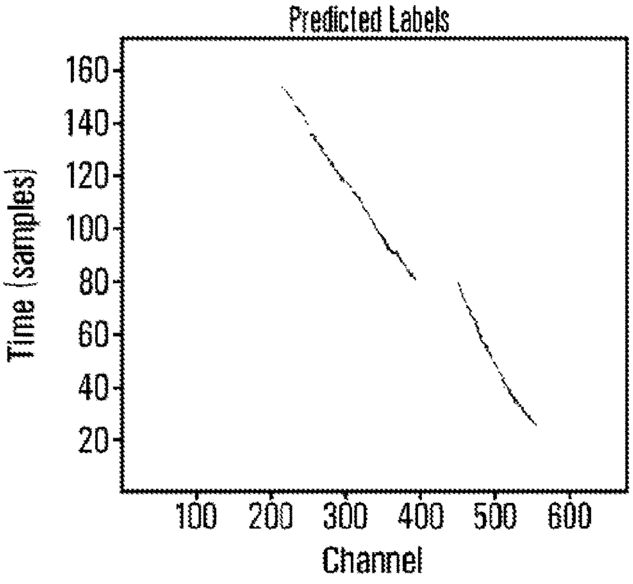
Figure 16A:
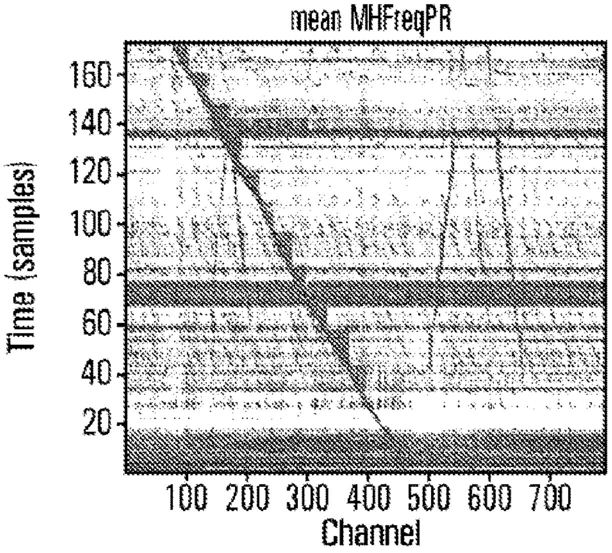
FIGS. 16A-16C are plots of mean MHFreqPR, mean RMS, and PIG movement, according to an embodiment of the disclosure.
Figure 16B:
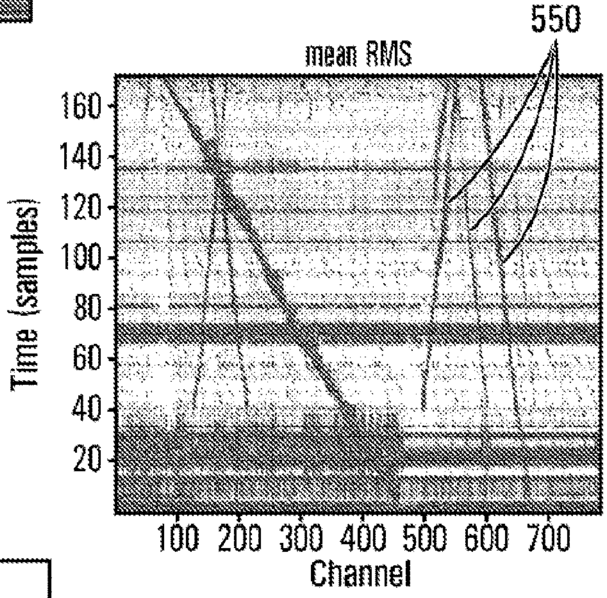
Figure 16C:
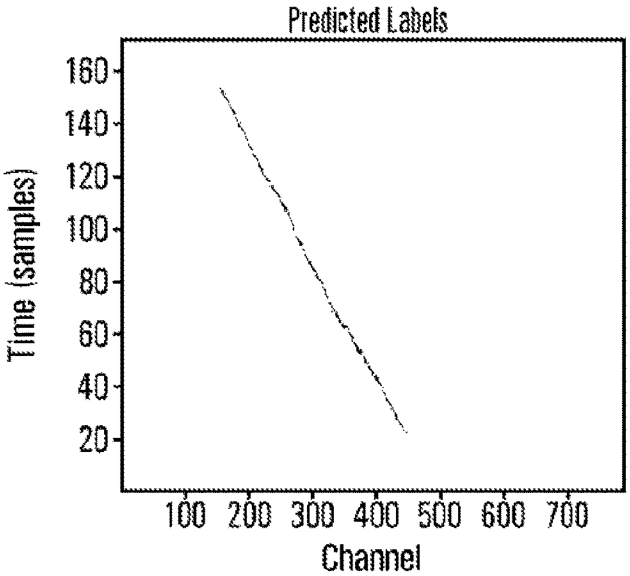

Each of FIGS. 12A-12C, 13A-13C, 14A-14C, 15A-15C, and 16A-16C show plots of, respectively, mean MHFreqPR, mean RMS, and resultant PIG movement data indicative of movement of a PIG within a pipeline. As can be seen, lines 550 in FIG. 16B, for example, relate to vehicle movement and are removed at block 460, as discussed above. Furthermore, wide horizontal lines, for example as seen at 525 in FIG. 13A and that relate to the flow of the fluid within the pipeline, are also removed at block 460, as discussed above.

The PIG movement data that is obtained may be used for various purposes. For example, PIGs may occasionally break down within a pipeline, and removal of the PIG from the pipeline then becomes necessary. By generating PIG movement data for example as shown in FIGS. 10, 12A-12C, 13A-13C, 14A-14C, 15A-15C, and 16A-16C, one may determine the likely position within the pipeline at which the PIG may be found. In addition, establishing the PIG's speed during movement within the pipeline may enable one to determine when the PIG is likely to exit the pipeline.

Furthermore, control module 15 may be configured to output one or more notifications based on the PIG movement data. For example, control module 15 may send a notification to a receiving device to alert a user of the receiving device when the PIG is approaching a pig catching station, or if, for instance, acceleration/deceleration of the PIG is detected.

Figure 21:
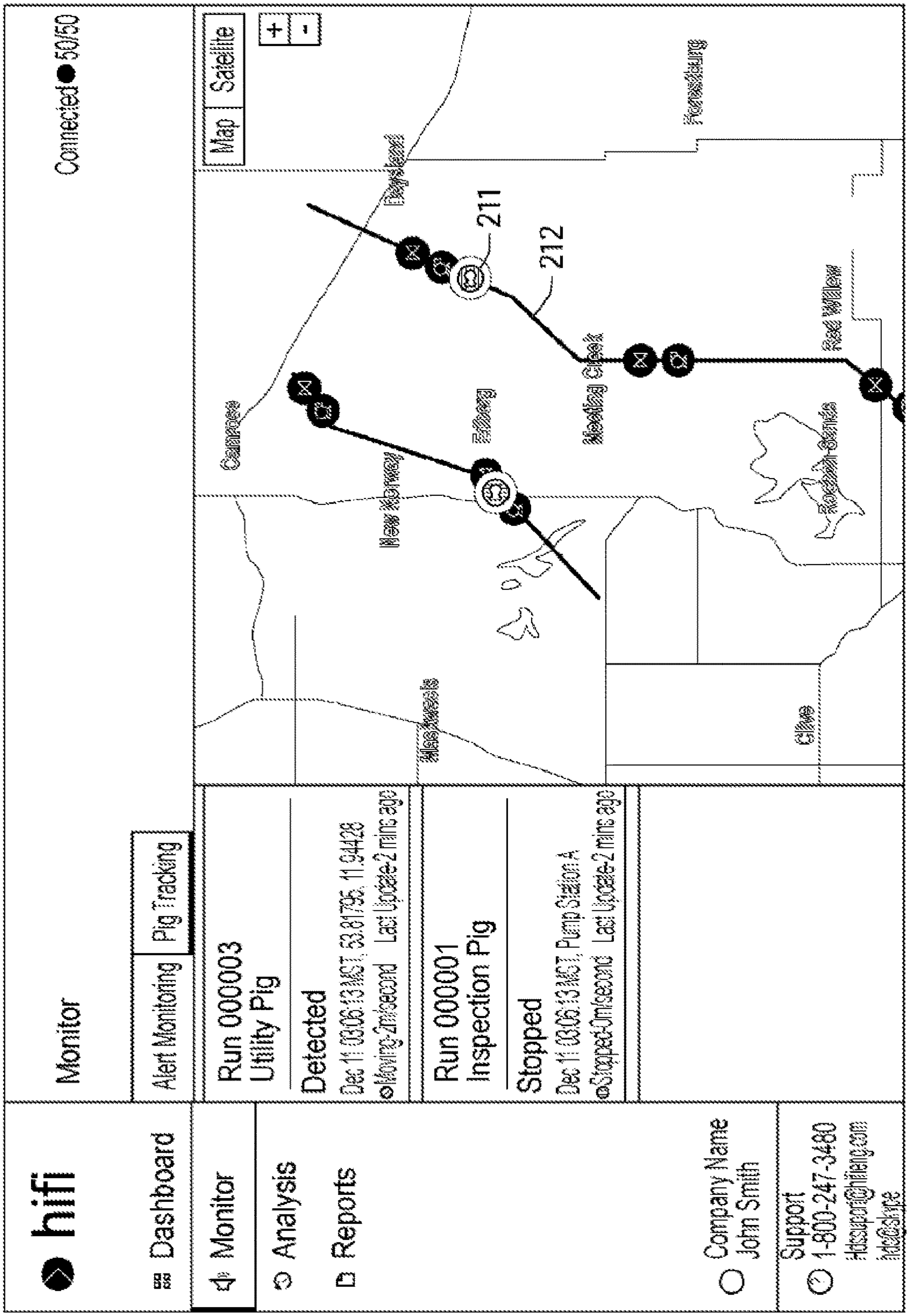
FIG. 21 shows a graphical user interface displaying a position of a PIG relative to a pipeline, according to an embodiment of the disclosure.

More generally, based on the PIG movement data generated by control module 15, a display such as a graphical user interface may be configured to display, in real-time, an indication of a position of the PIG relative to the conduit. An example of such a display is shown in FIG. 21. As can be seen, the position of PIG 221 relative to pipeline 222, as determined by control module 15, is displayed to a user on a web interface. Additionally, a current speed of PIG 221, an estimated time of arrival at a next point of interest, and a status of PIG 211 (e.g. moving vs. stuck) are also displayed to the user.

Control module 15 may be further configured to perform a variety of other analyses or functions, as described in further detail below.

For example, according to some embodiments, control module 15 may use dead reckoning to estimate a position of the PIG along "low-visibility" portions of the pipeline. A "low-visibility" portion of the pipeline may refer, for example, to a portion of the pipeline that the optical fiber is not positioned to monitor. For example, based on the last known speed of the PIG immediately prior to the PIG entering a low-visibility zone, control module 15 may use dead reckoning to estimate the point in time at which the PIG will exit the low-visibility zone. To accomplish this, the last known location of the PIG in the pipe, and the last known speed of the PIG, may be used to estimate the PIG's current location.

Figure 17:
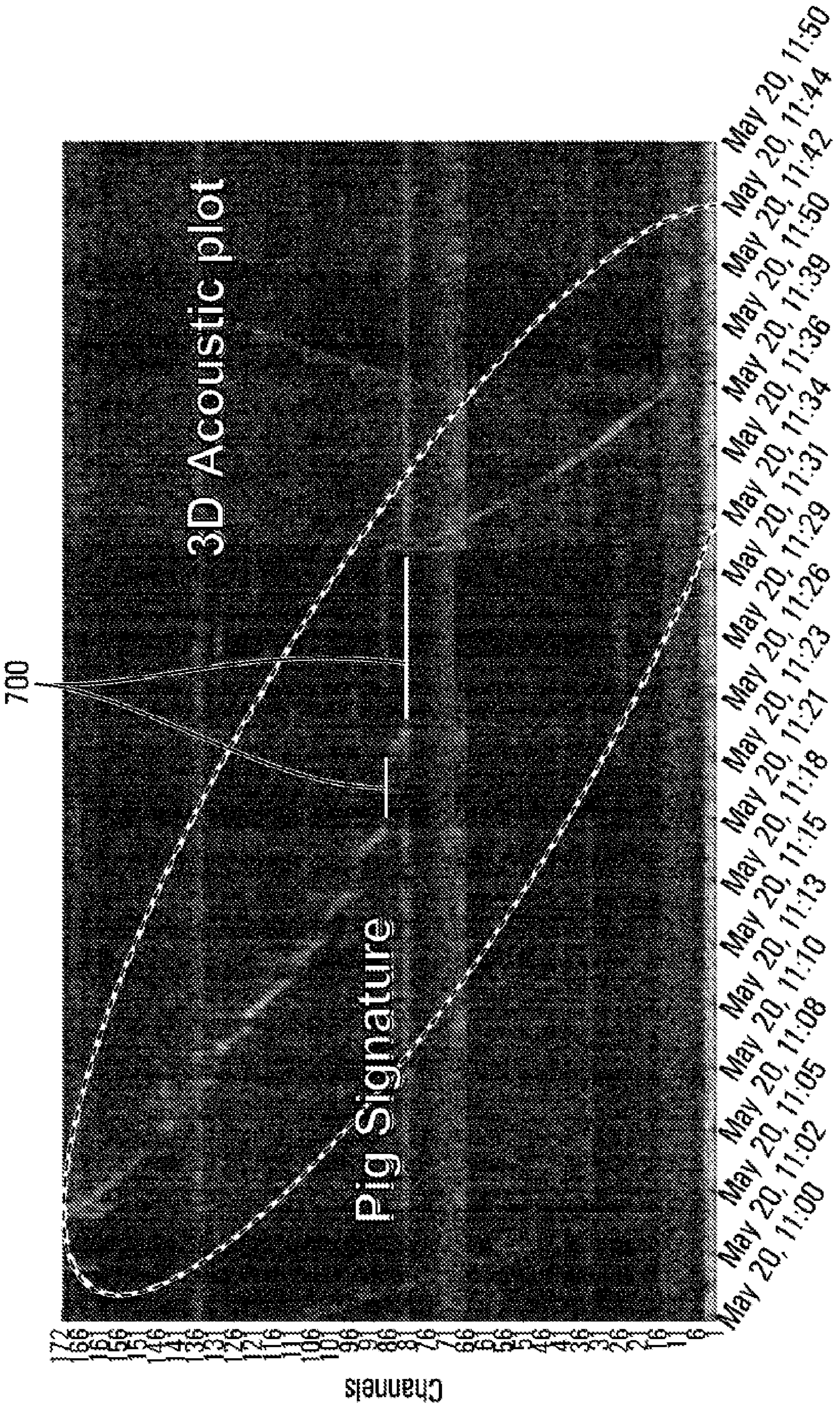
FIG. 17 is a plot of acoustic magnitude as a function of pipeline channels and time, according to an embodiment of the disclosure.
Figure 18:
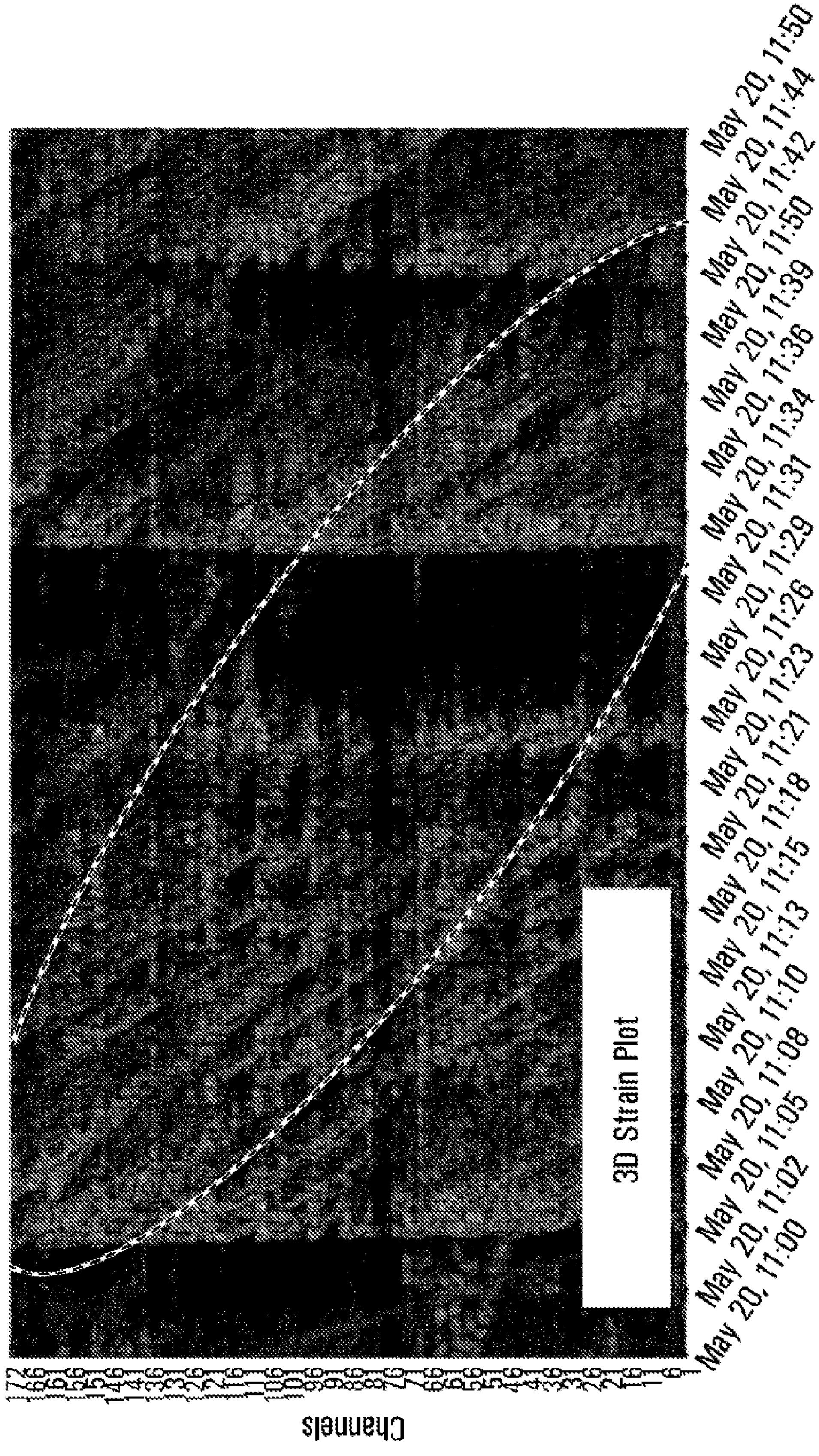
FIG. 18 is a plot of strain as a function of pipeline channels and time, according to an embodiment of the disclosure.

According to some embodiments, one may determine from the PIG movement data one or more areas or locations within the pipeline at which the PIG slows down or in some cases may become stuck within the pipeline. For example, as can be seen in FIG. 17 which shows a plot of acoustic magnitude corresponding to a PIG run, the horizontal lines 700 (corresponding roughly to channels 82 and 87) indicate periods of time during which the PIG was not moving within the pipeline (possible having become stuck within the pipeline). As can be seen in FIG. 18 which shows a plot of strain for the same PIG run that is illustrated in FIG. 17, the PIG stoppages identified in FIG. 17 are associated with corresponding flow changes in FIG. 18 (the relatively dark regions) which resulted in less flow-induced strain being measured on the pipeline. By performing multiple PIG runs and tracking the locations at which the PIG typically becomes stuck for a period of time, it may be possible to determine a specific channel or channels of the pipeline that are susceptible to leading to PIG stoppages, potentially due to a constriction or blockage, and that may therefore be in need of investigation.

Figure 19:
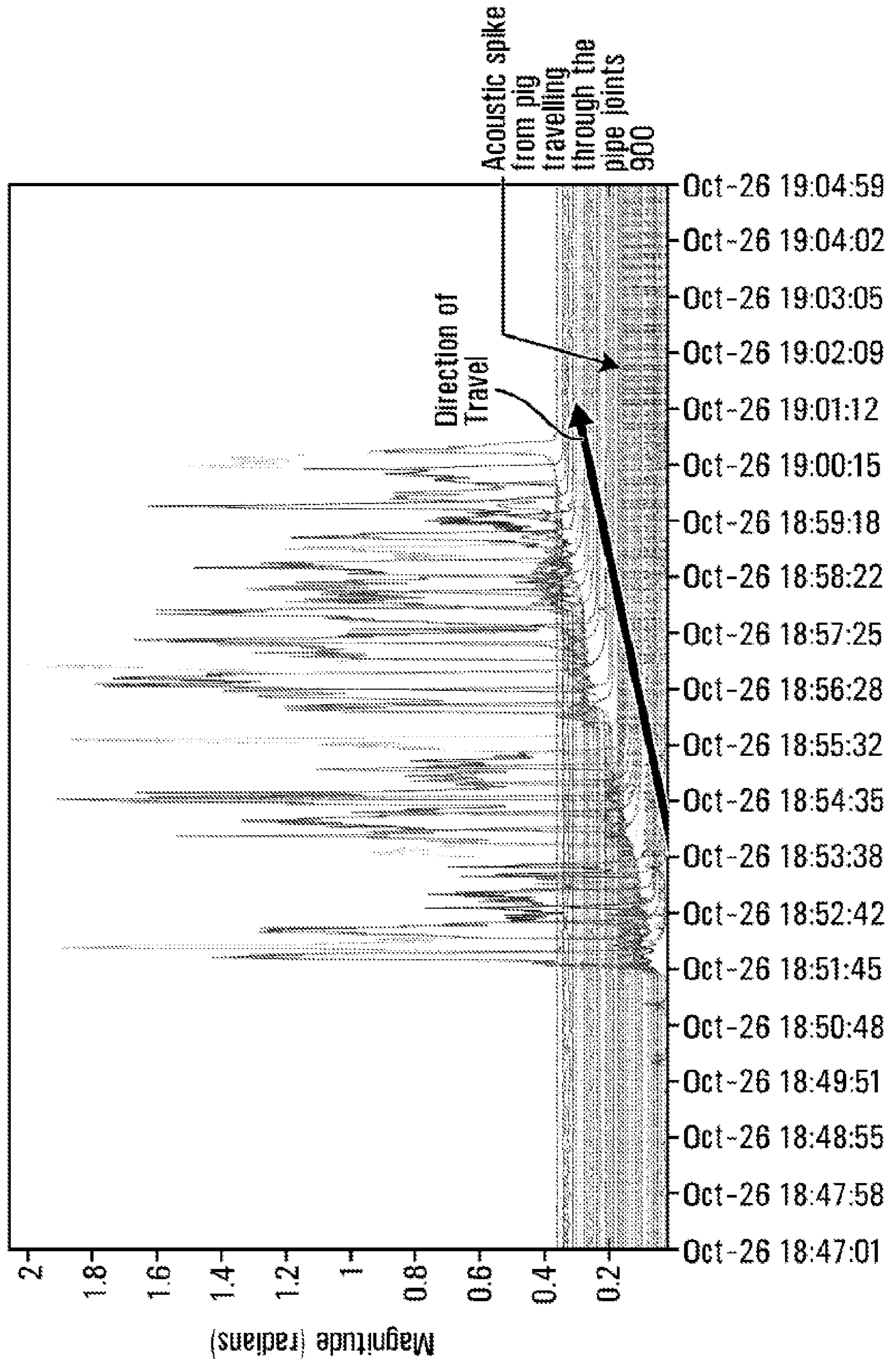
FIG. 19 is a plot of acoustic magnitude as a function of pipeline channels and time, showing low-frequency acoustic spikes, according to an embodiment of the disclosure.
Figure 20:
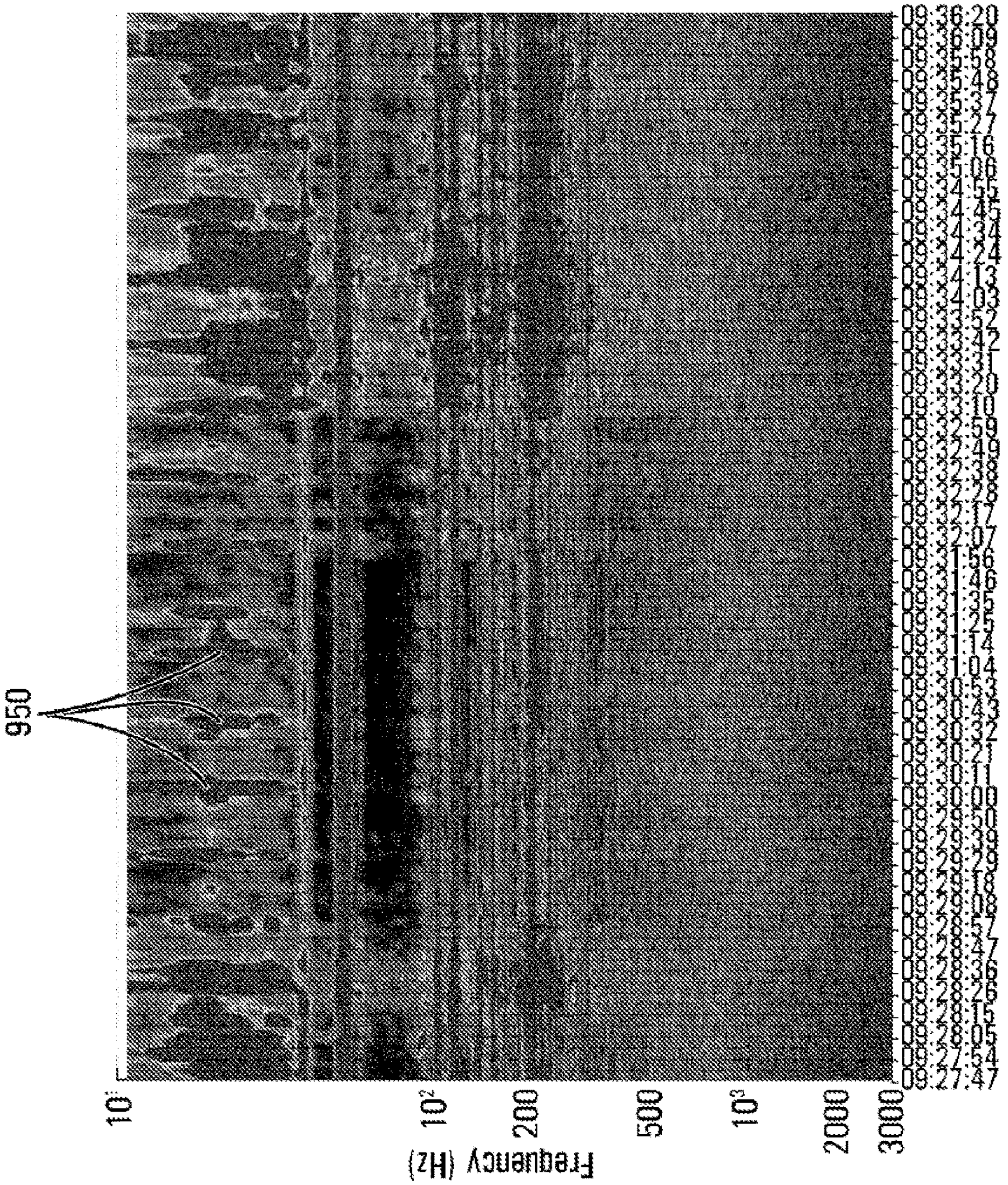
FIG. 20 is a plot of acoustic magnitude as a function of frequency and time, showing low-frequency acoustic spikes, according to an embodiment of the disclosure.

Still further, according to some embodiments, the movement of the PIG may be tracked in "low-visibility" zones by observing low-frequency acoustic spikes generated when a PIG moves past a pipe joint at the intersection of two interconnecting sections of pipe. For example, turning to FIG. 19, there is shown a plot of PIG acoustic data generated as the PIG moves through a portion of pipeline that is being monitored. When the PIG moves past a pipe joint, a low-frequency acoustic signal is often generated as a result of the PIG interacting with the pipe joint. This low-frequency acoustic signal (typically less than about 100 Hz) propagates down the pipeline in both directions, and can be detected from regions of the pipeline that are not being monitored by optical fiber. Therefore, using for example a dead reckoning technique, it is possible to estimate the position of the PIG in such "low-visibility" zones by observing when the low-frequency acoustic spikes that are generated by the PIG in such "low-visibility" zones, as the PIG moves past pipe joints in such "low-visibility" zones, are detected. The low-frequency spikes 900 can be seen in FIG. 19, as well as in FIG. 20 (low-frequency spikes 950) which shows a frequency spectrum for acoustic signals detected at a single channel. It is also possible to use low-frequency spikes 900 as an additional PIG detection parameter for normal PIG detection, i.e. without being restricted to "low-visibility" zones.

There will now be described, in connection with FIGS. 22-30, methods of processing PIG movement data in order to reject false positives that, for example, may erroneously suggest movement of a PIG. The methods may be performed by one or more suitable processors, such as control module 15, acting on the PIG movement data.

Figure 22:
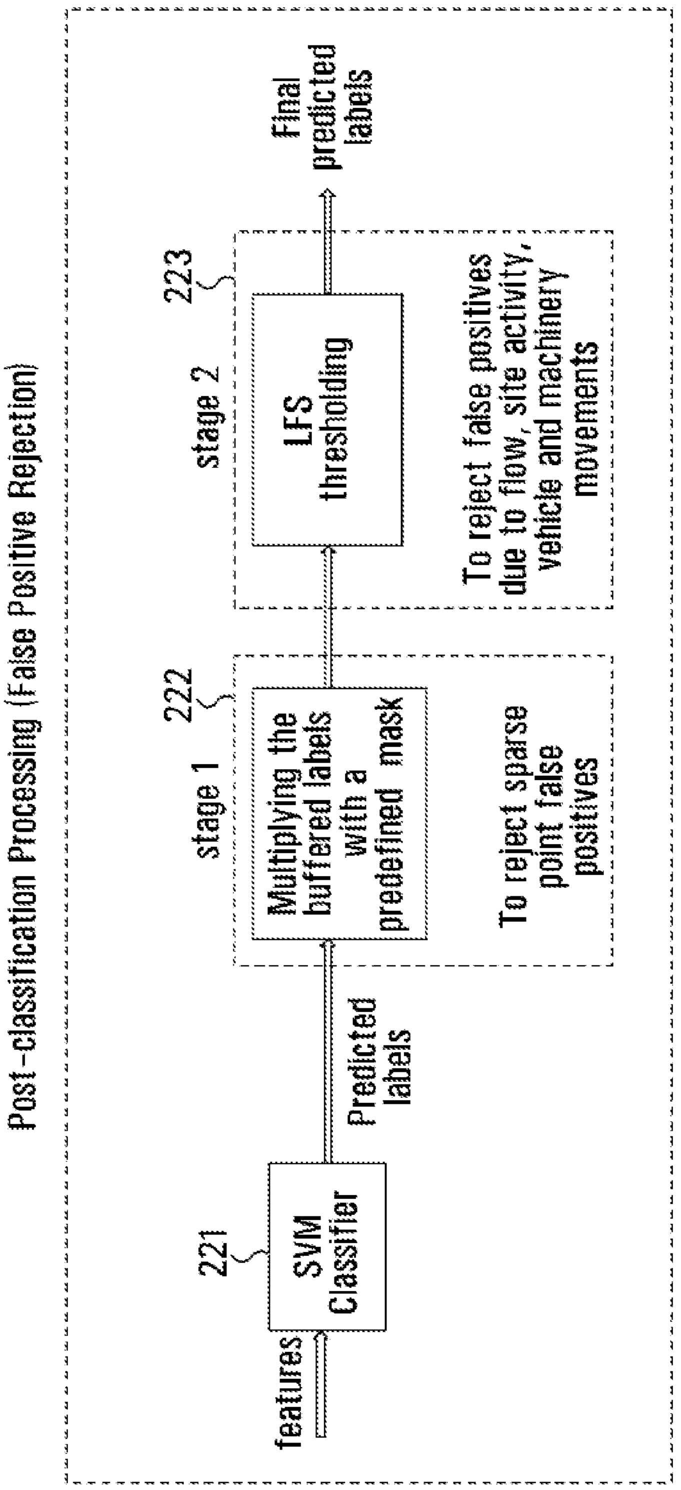
FIG. 22 is a flow diagram of a method of processing PIG movement data to remove false positives, according to an embodiment of the disclosure.
Figure 23A:
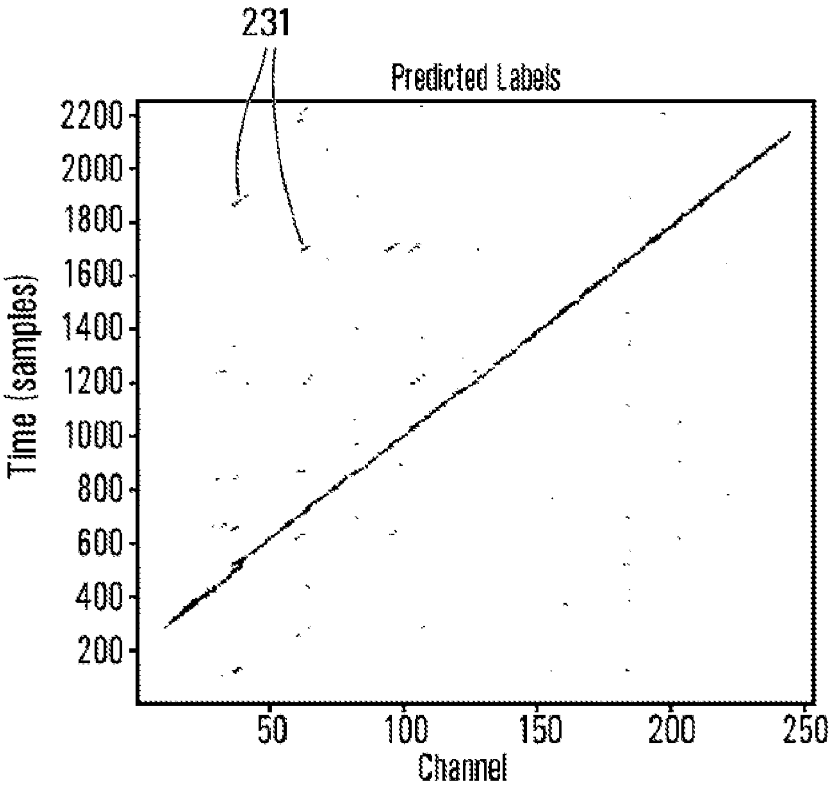
FIGS. 23A and 23B are plots of PIG movement data respectively before and after the removal of sparse points, according to an embodiment of the disclosure.

Turning to FIG. 22, there is shown a flow diagram of a method of post-classification processing of PIG movement data, according to an embodiment of the disclosure. As discussed above, a classifier such as SVM classifier 221 outputs the PIG movement data based on features or signatures extracted from parameter data obtained by the sensors. At this stage, the PIG movement data may include false positives of various types. A first type of false positive may include sparse points. Sparse points may relate to predicted PIG movement that lies outside the main predicted path of PIG travel, as shown in FIG. 23A. A second type of false positive may include false positives due to movement (inside or outside of the pipeline) having a speed similar to that of the PIG. Such movement may include, for example, vehicle and/or machine movement, site activities, and flow changes within the pipeline. Such movement may erroneously be interpreted as movement of the PIG. In an effort to remove each of these types of false positives, the output of SVM classifier 221 is passed through two false positive rejection stages 222 and 223.

According to the first stage 222 of false positive rejection, a predefined mask is applied to the PIG movement data. For example, the mask may be defined according to a line have a predetermined slope. The slope and direction of the line are defined based on the speed and travel direction of the PIG. When applied to the PIG movement data, sparse points not fitting the line having the predetermined slope are rejected.

According to the second stage 223 of false positive rejection, the output of the first stage of false positive rejection 222 undergoes a process referred to as Low Frequency Stub (LFS) thresholding. As described in further detail below, LFS thresholding may remove false positive signals having a similar slope as that of the PIG movement. As described above, when the PIG moves past a pipe joint, a low-frequency acoustic signal is often generated as a result of the PIG interacting with the pipe joint. This low-frequency acoustic signal (typically less than about 100 Hz) propagates down the pipeline in both directions, and can be detected even from regions of the pipeline that are not being monitored by optical fiber. It is on the basis of these low-frequency signals that the second stage 223 of false positive rejection may remove signals that may erroneously suggest movement of a PIG.

Figure 23B:
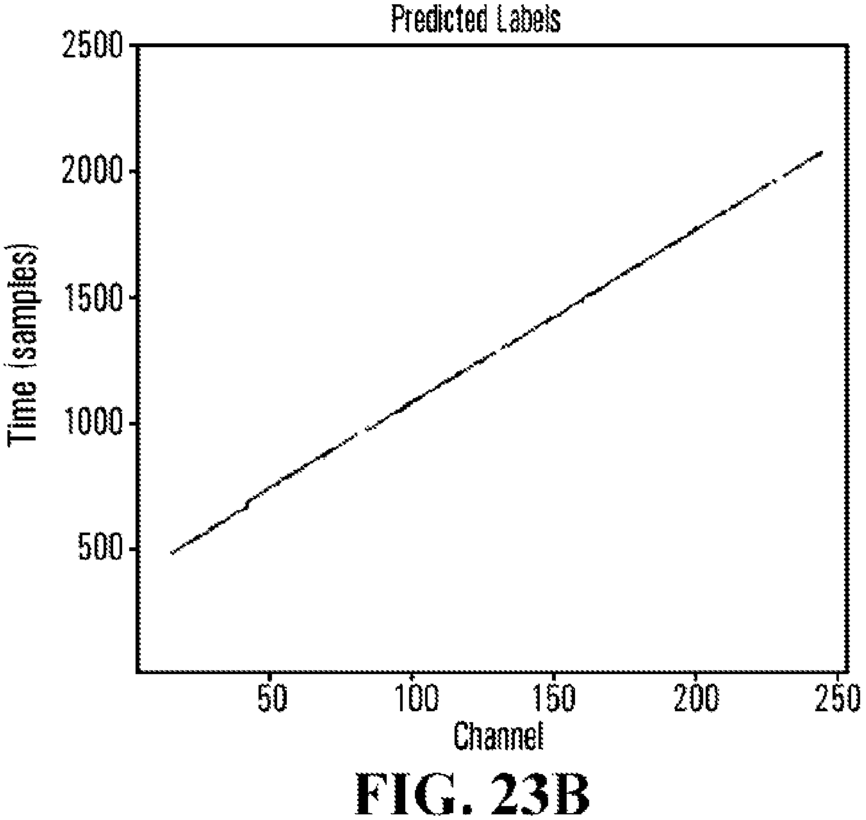

FIGS. 23A and 23B illustrate the PIG movement data before and after the first and second stages 222 and 223 of false positive rejection. As can be seen in FIG. 23A, the PIG movement data includes a number of sparse points 231 that may erroneously suggest movement of a PIG. Following the first and second stages 222 and 223 of false positive rejection, the refined PIG movement data can be seen in FIG. 23B, wherein the sparse points have been identified as false positives and therefore have been eliminated from the final PIG movement data, and wherein LFS thresholding has been applied to the PIG movement data (after the removal of sparse points).

Figure 24:
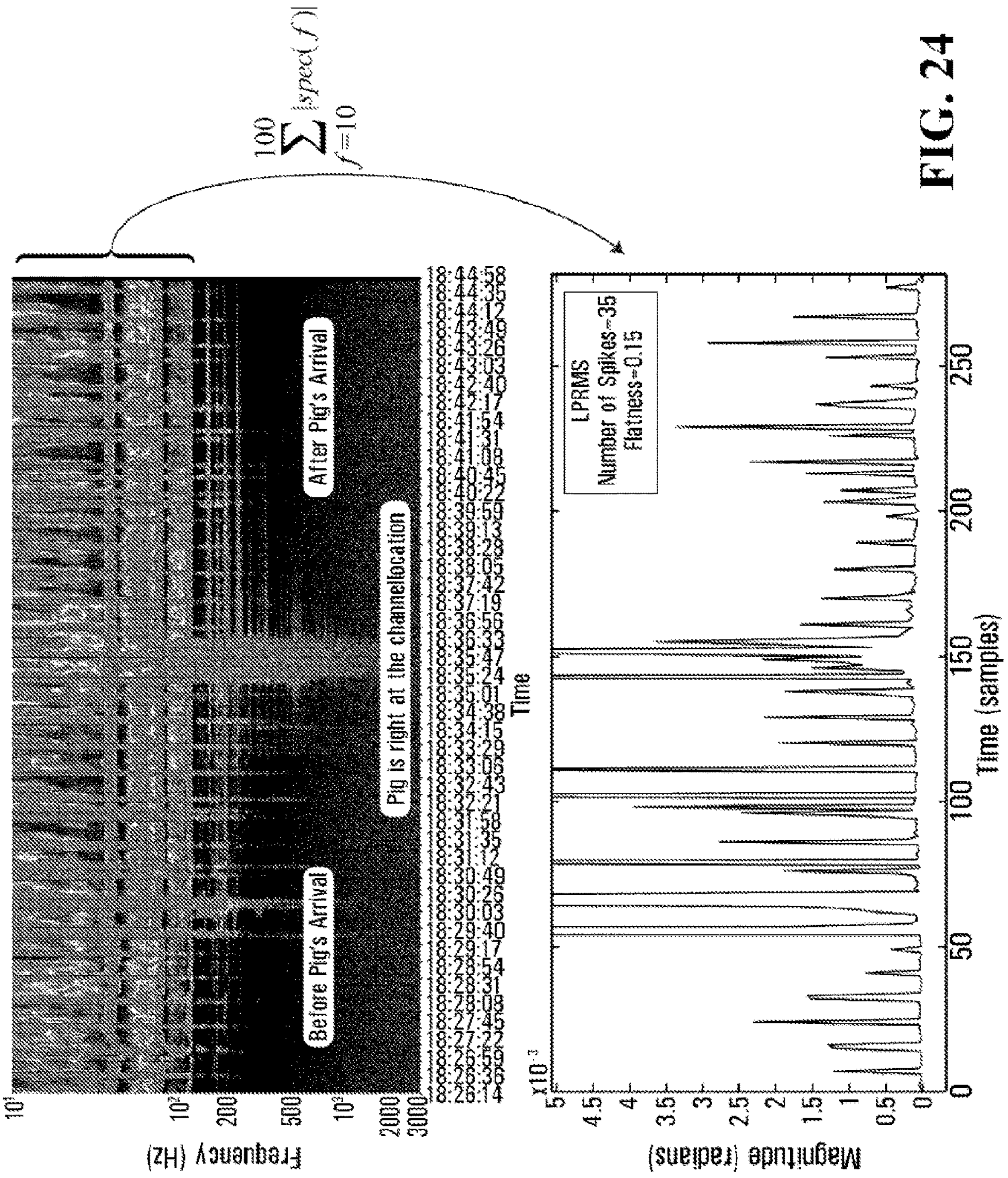
FIG. 24 shows plots of low-frequency stubs (LFS) and low-pass RMS (LPRMS) data, according to an embodiment of the disclosure.

Turning to FIG. 24, there will now be described the process of LFS thresholding in more detail. At the top of FIG. 24 is shown a power spectral density (PSD) plot showing low frequency signals ("stubs") generated before, during, and after the arrival of the PIG at the location of the channel sensor. The PSD plot may be obtained by using, for example, a Fourier transform. The lowermost plot is a plot of low-pass RMS ("LPRMS") and indicates the total power contained in the low-frequency stubs in the PSD plot, and is calculated by summing the magnitude of the frequency signals between 10 and 100 Hz in the PSD plot.

According to some embodiments, instead of generating power spectral density data, the LPRMS may be determined by applying to the time-domain signal a suitably shaped filter, such as a bandpass Butterworth or Chebyshev filter.

Two parameters are calculated from the LPRMS. A first parameter is the number of spikes within the LPRMS plot. A spike may be defined according to one or more of a predefined minimum height, a predefined minimum prominence, and a predefined minimum distance between adjacent spikes. A second parameter that is determined from the LPRMS plot is a flatness, which may be defined as follows:

$$\text{Flatness} = \frac{\sqrt[N]{\prod_{n=0}^{N-1} x(n)}}{\frac{\sum_{n=0}^{N-1} x(n)}{N}} = \frac{\exp\left(\frac{1}{N}\sum_{n=0}^{N-1} \ln x(n)\right)}{\frac{1}{N}\sum_{n=0}^{N-1} x(n)}$$

x represents the data points in the LPRMS plot. The flatness parameter is determined based on the ratio of the geometric mean to the arithmetic mean of the LPRMS values, and may quantify the spiky versus flat nature of the data. One expects PIG-induced LPRMS data to be "spiky" because, as described above, a frequency spike is generated when the PIG travels through a pipe joint. The pipe joints are generally a few meters apart, and so one would expect to see some time separation between successive spikes. Therefore, if the LPRMS data is determined to be relatively flat, i.e. not "spiky" (with a relatively high flatness value), then it is more likely that the LRPMS data in question does not relate to any PIG-induced signature.

In the LPRMS plot shown at the bottom of FIG. 24, 35 spikes are identified and the flatness of the LPRMS plot is determined to be 0.15.

Figure 25:
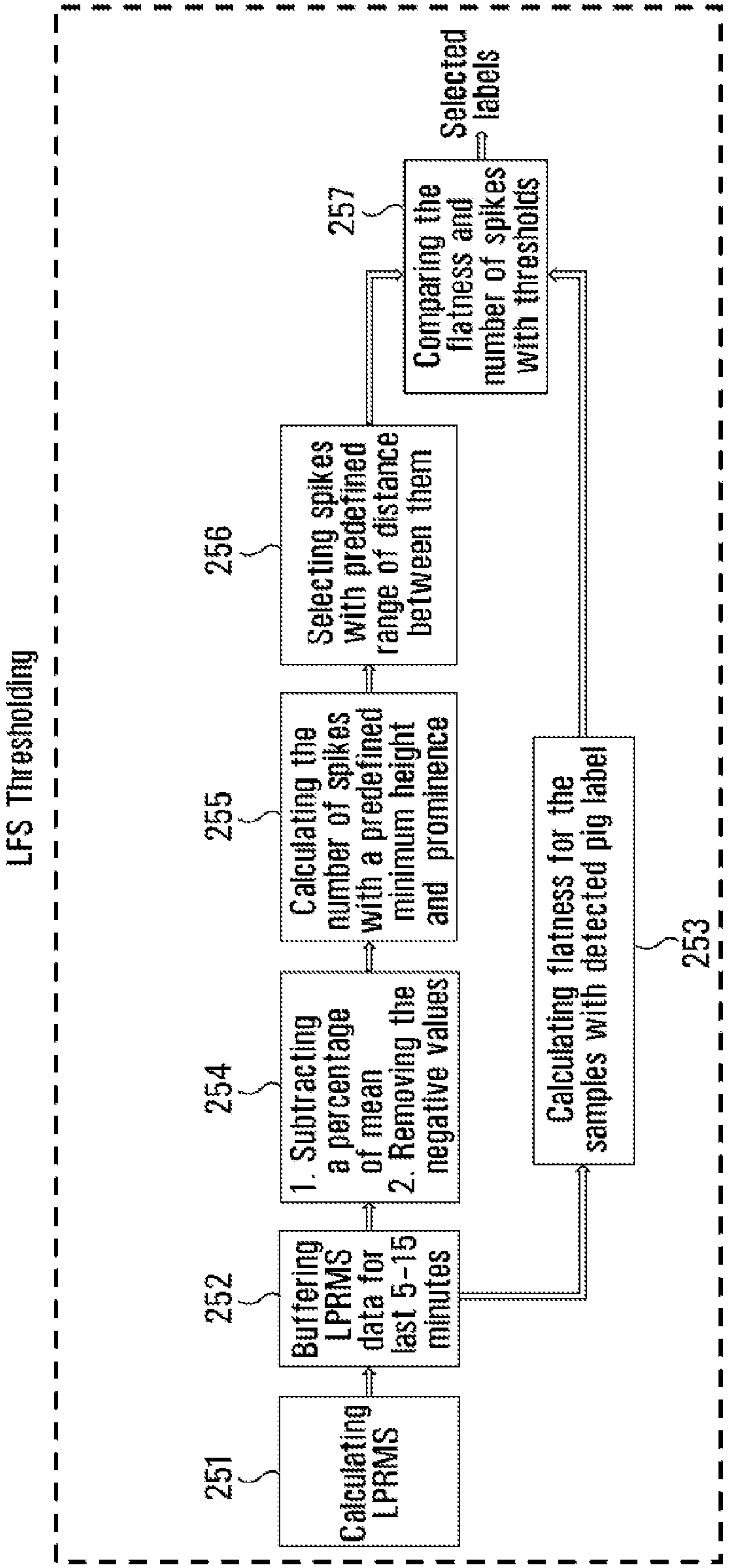
FIG. 25 is a flow diagram of a method of performing LFS thresholding on PIG movement data, according to an embodiment of the disclosure.
Figure 26B:
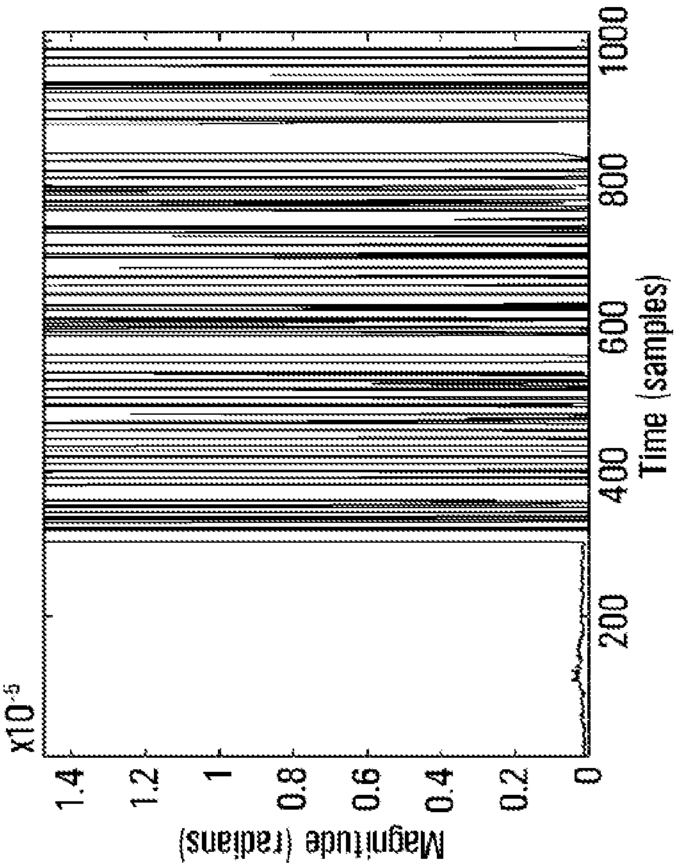
FIGS. 26A and 26B show respectively buffered LPRMS data and LPRMS data after the subtraction of a percentage of the mean value and the removal of negative values, according to an embodiment of the disclosure.
Figure 26A:
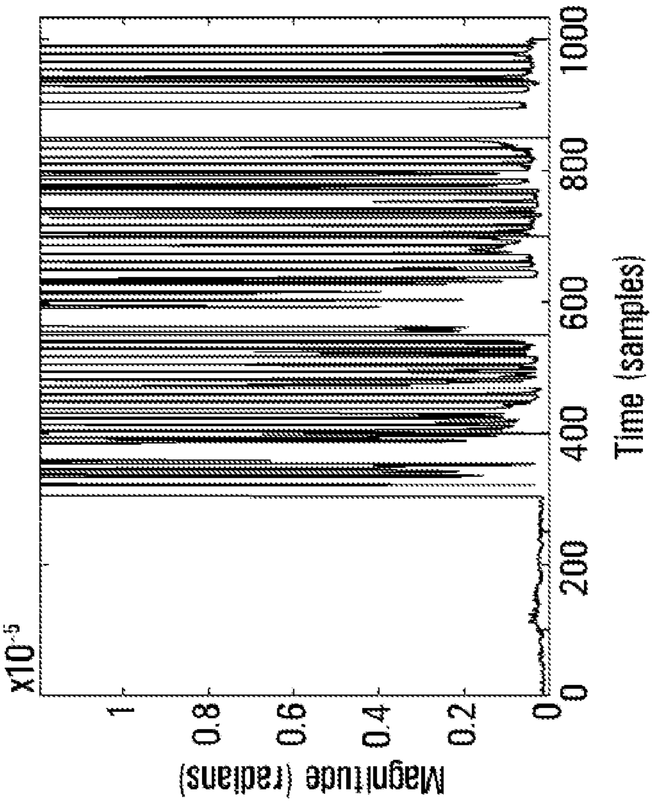

Turning to FIG. 25, there is shown a flow diagram of a method of performing LFS thresholding on PIG movement data, according to an embodiment of the disclosure. At block 251, the LPRMS data is calculated. For example, as described above, the LPRMS data may be calculated from the PSD plot, or by applying to the time-domain signal a suitably shaped filter. At block 252, the LPRMS data is buffered. For example, according to one embodiment, the last 5-15 minutes of LPRMS data is buffered. At block 253, the flatness of the LPRMS data is determined. At block 254, a percentage of a mean of the LPRMS data is subtracted from the LPRMS data, and any negative values are removed. An example of LPRMS data that is input to block 254 is shown in FIG. 26A, and an example of the output of block 254 is shown in FIG. 26B.

Figure 27B:
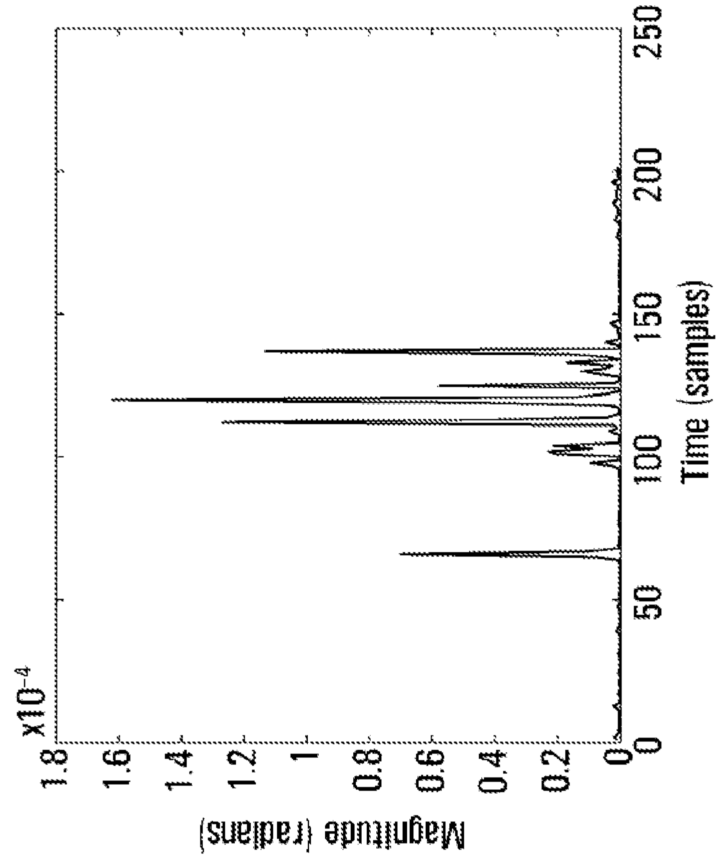
FIGS. 27A and 27B show spikes from an example PIG run and an example of above-ground site activity such as heavy vehicle movement and digging, according to an embodiment of the disclosure.
Figure 27A:
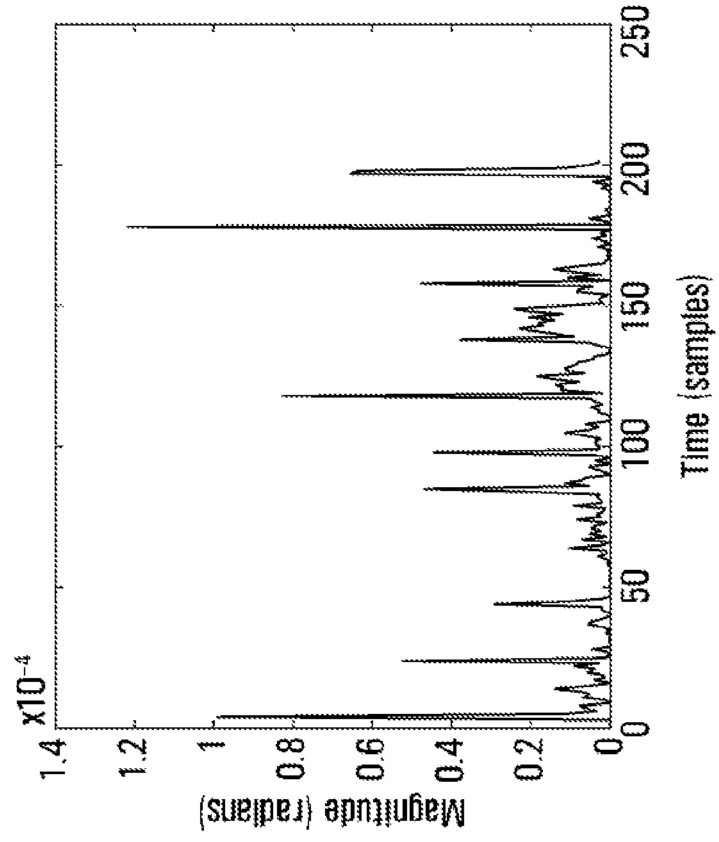

At block 255, the number of low-frequency spikes within the LPRMS data that is output from block 254 is determined. For example, the number of low-frequency spikes is determined based on a preset minimum prominence, and based on a preset minimum height. Any spikes not meeting such requirements may not be designated as low-frequency spikes. At block 256, the determined number of low-frequency spikes is refined by selecting only those low-frequency spikes that are separated by a preset distance. The preset distance may relate to the distance separating adjacent joints within the pipeline. FIGS. 27A and 27B show, respectively, spikes from an example PIG run and an example of above-ground site activity such as heavy vehicle movement and digging. LFS thresholding seeks to eliminate spikes such as those shown in FIG. 27B.

At block 257, the determined number of low-frequency spikes is compared to a preset threshold, and the determined flatness is compared to a preset flatness. Based on the comparisons, false positives within the PIG movement data may be determined, and rejected from the PIG movement data. Each comparison acts independently of the other. Therefore, if a single comparison indicates a false positive, that portion of PIG movement data is rejected, regardless of the other comparison. As can be seen, the LPRMS data is used to calculate the flatness parameter and the number of spikes within the LPRMS data, and these two parameters are then used as acceptance/rejection criteria for data within the PIG movement data.

Figure 28A:
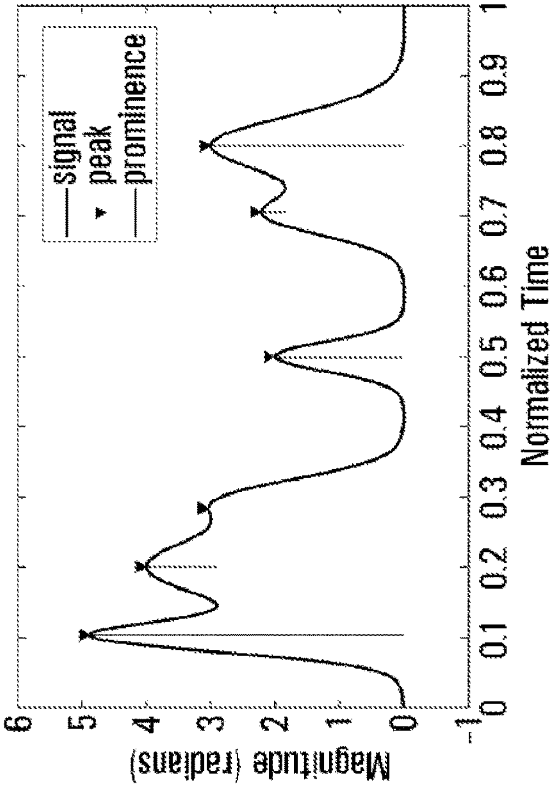
FIGS. 28A-C show respectively peak prominence, isolated peaks, and an example of non-PIG related high-magnitude isolated peaks, according to an embodiment of the disclosure.
Figure 28B:
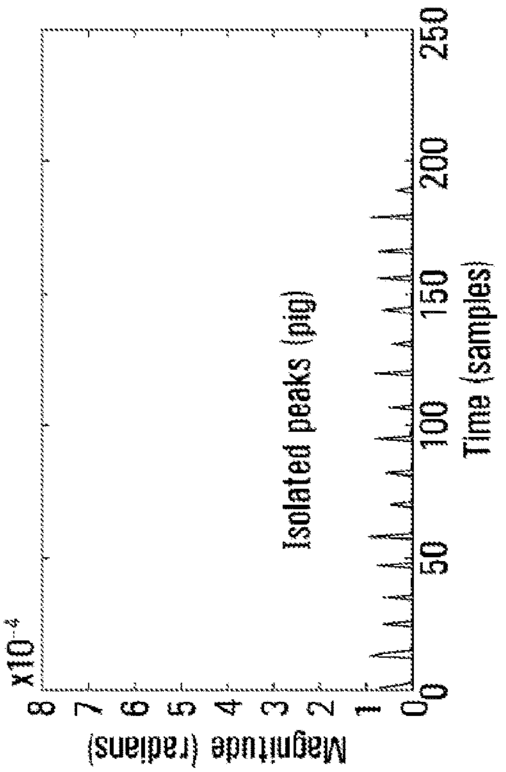
Figure 28C:
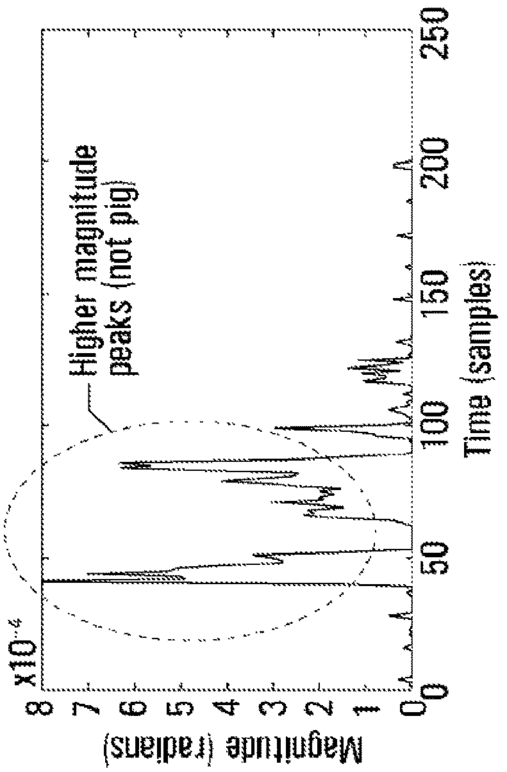

Turning to FIG. 28A, there is shown an example of how the prominence of a peak is calculated. For example, the prominence of a peak is a measure of by how much the peak stands out relative to the heights of other peaks. A low, isolated peak can be more prominent than one that is higher but is an otherwise unremarkable peak among a series of tall peaks. FIG. 28B shows isolated peaks, i.e. peaks with sufficient prominence to be identified as independent peaks that could have been generated by the movement of the PIG through a pipe joint. FIG. 28C shows peaks whose magnitudes are too large to be accepted as being possibly induced by the travel of a PIG through pipe joints. This is one reason why the magnitude of the isolated peaks is compared to a percentage of the mean of the LPRMS data.

Figure 29:
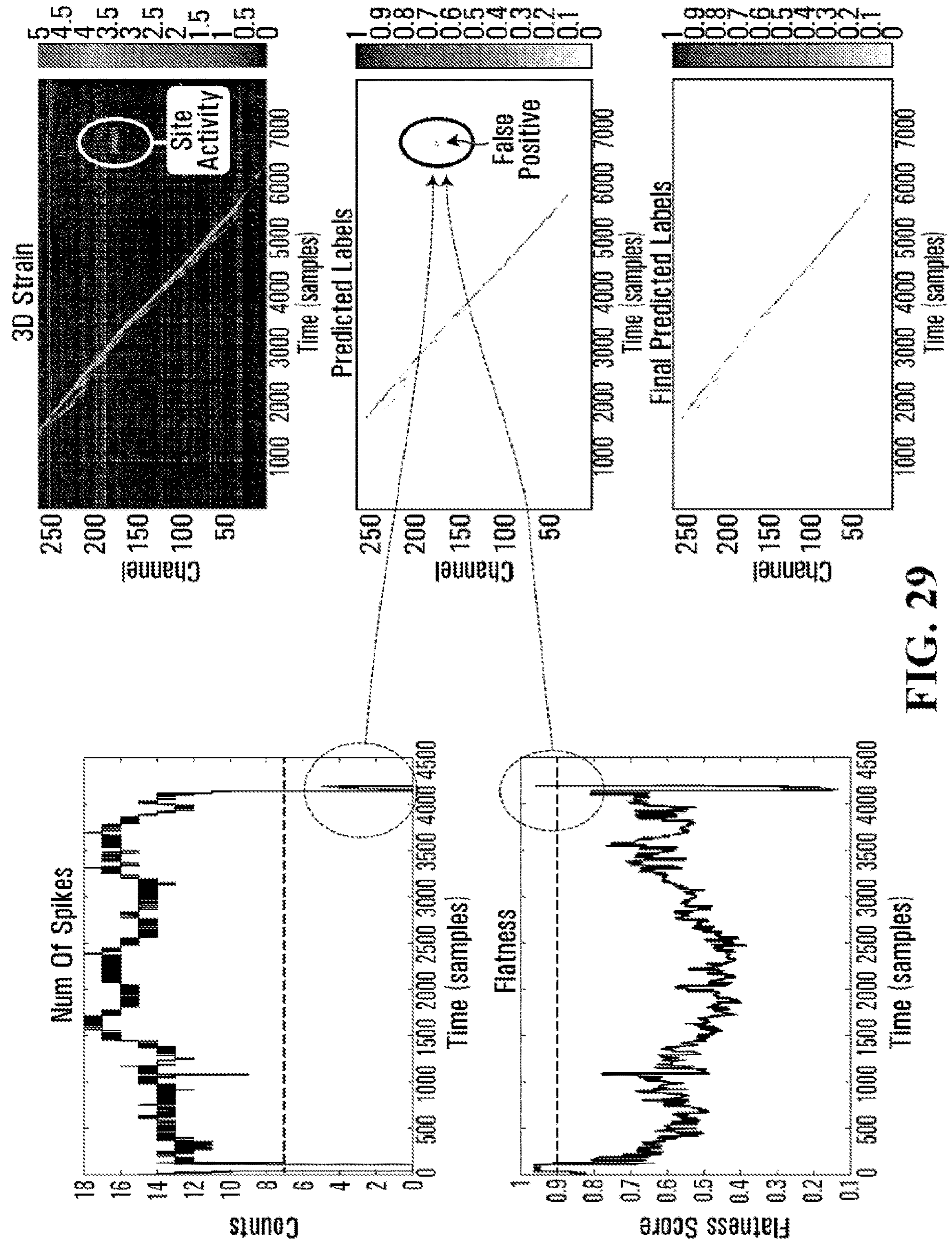
FIGS. 29 and 30 show plots illustrating the removal of false positives from PIG movement data based on processed LPRMS data, according to an embodiment of the disclosure.
Figure 30:
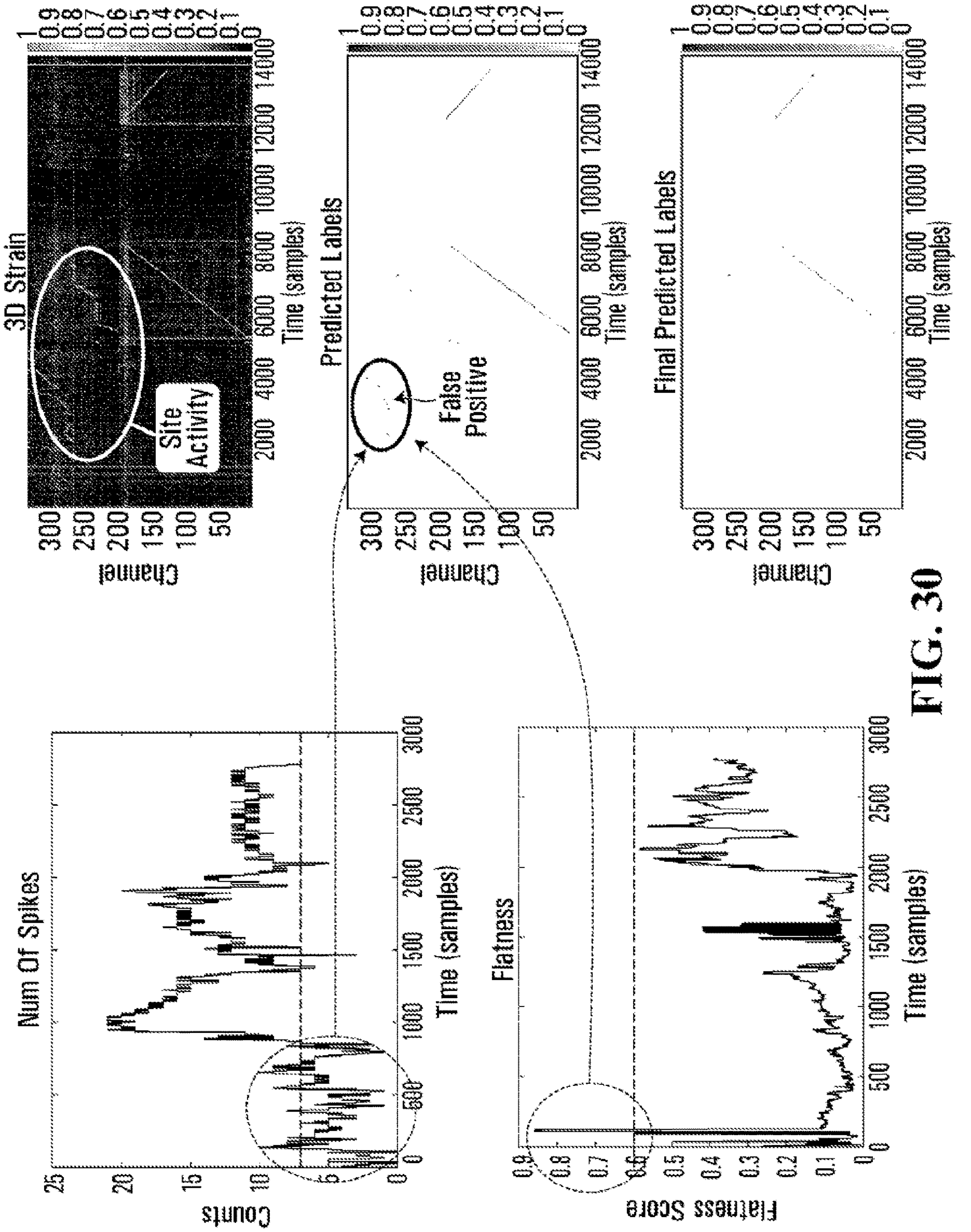

Examples of the result of LFS thresholding can be seen in FIGS. 29 and 30. In FIG. 29, a plot of 3D strain as a function of channel includes data indicative of site activity that is unrelated to movement of the PIG. This data manifests itself as one or more false positives within the PIG movement data. LFS thresholding performed on the PIG movement data indicates a sudden decrease in the number of low-frequency stubs, corresponding to the false positive. Similarly, the flatness of the LPRMS data increases at the same point in time, again corresponding to the false positive. When the flatness and number of low-frequency stubs are compared to their respective thresholds, it may be determined that these elements of the LPRMS data are false positives and do not correspond to movement of the PIG. Accordingly, the relevant data may be removed from the PIG movement data, with the final, post-processed PIG movement data seen in at bottom right of FIG. 29.

Likewise, in FIG. 30, a plot of 3D strain as a function of channel includes data indicative of site activity that is unrelated to movement of the PIG. This data manifests itself as one or more false positives within the PIG movement data. LFS thresholding performed on the PIG movement data indicates a sudden decrease in the number of low-frequency stubs, corresponding to the false positive. Similarly, the flatness of the LPRMS data increases at the same point in time, again corresponding to the false positive. When the flatness and number of low-frequency stubs are compared to their respective thresholds, it may be determined that these elements of the LPRMS data are false positives and do not correspond to movement of the PIG. Accordingly, the relevant data may be removed from the PIG movement data, with the final, post-processed PIG movement data seen in at bottom right of FIG. 30.

While the disclosure has been described in the context of optical fiber, other types of sensors may be used. For example, a microphone or any other suitable acoustic sensor may be used to detect acoustic signals from the fluid conduit.

The embodiments have been described above with reference to flowcharts and block diagrams of methods, apparatuses, systems, and computer program products. In this regard, the flowcharts and block diagrams in the figures illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general-purpose computer, special-purpose computer, or other programmable data processing apparatus to produce a machine, such that the instructions, which execute via the processor of the computer or other programmable data-processing apparatus, create means for implementing the functions or acts specified in the blocks of the flowcharts and block diagrams.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

The word “a” or “an” when used in conjunction with the term “comprising” or “including” in the claims and/or the specification may mean “one”, but it is also consistent with the meaning of “one or more”, “at least one”, and “one or more than one” unless the content clearly dictates otherwise. Similarly, the word “another” may mean at least a second or more unless the content clearly dictates otherwise.

The terms “coupled”, “coupling” or “connected” as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term “and/or” herein when used in association with a list of items means any one or more of the items comprising that list.

As used herein, a reference to “about” or “approximately” a number or to being “substantially” equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of determining a position of a pipeline inspection gauge (PIG) in a fluid conduit, comprising:

while the PIG is moving through the fluid conduit, using one or more sensors positioned along the fluid conduit to detect one or more signals;

extracting parameter data from the detected one or more signals, wherein the parameter data comprises one or more parameters of the detected one or more signals as a function of time and position along the fluid conduit; and generating, using the parameter data, PIG movement data indicative of a position of the PIG in the fluid conduit as a function of time, wherein generating the PIG movement data comprises:

extracting, from the parameter data, one or more signatures for each parameter; and generating, using the one or more signatures, the PIG movement data, and wherein extracting the one or more signatures for each parameter comprises extracting a second signature by, for each parameter:

determining diagonal differences of values of the parameter as a function of position along the fluid conduit and as a function of time; and determining, using the diagonal differences, a median of the diagonal differences relative to a set of predefined lines.

2. The method of claim 1, further comprising:

before detecting the one or more signals, launching the PIG into the fluid conduit.

3. The method of claim 1, wherein the one or more sensors comprise one or more lengths of optical fiber.

4. The method of claim 3, wherein detecting the one or more signals comprises interrogating the one or more lengths of optical fiber using an optical fiber interrogator configured to transmit one or more light pulses along the one or more lengths of optical fiber and to detect reflections of the one or more light pulses.

5. The method claim 1, wherein the one or more signals comprise one or more of acoustic signals or strain signals.

6. The method of claim 1, wherein the one or more parameters comprise one or more of:

a first parameter comprising a ratio of a power of the one or more signals in a mid-range frequency band to a power of the one or more signals in a high-range frequency band;

a second parameter comprising a magnitude of the one or more signals; or a third parameter comprising strain experienced by the one or more sensors.

7. The method of claim 6, wherein the mid-range frequency band is from about 100 Hz to about 300 Hz and the high-range frequency band is from about 3 kHz to about 4 kHz.

8. The method of claim 6, wherein the one or more parameters comprise the third parameter and either the first or second parameter, and wherein generating the PIG movement data comprises:

generating the PIG movement data using a combination of the first parameter and the third parameter; or generating the PIG movement data using a combination of the second parameter and the third parameter.

9. The method of claim 1, wherein generating the PIG movement data comprises filtering the parameter data by:

applying one or more threshold functions to the parameter data; and based on the application of the one or more threshold functions, determining whether to discard at least some of the parameter data.

10. The method of claim 9, wherein the one or more threshold functions comprise one or more of:

one or more local threshold functions applicable to parameter data associated with one or more respective portions of the fluid conduit; or a global threshold function applicable to all of the parameter data.

11. The method of claim 1, wherein generating the PIG movement data further comprises:

inputting the one or more signatures to a trained classifier; and generating, using the classifier, the PIG movement data.

12. The method of claim 11, wherein the classifier comprises a support vector machine.

13. The method of claim 11, wherein the PIG is moving through the fluid conduit in a first direction, and wherein the method further comprises filtering the PIG movement data by:

identifying in the PIG movement data, and discarding, PIG movement data indicative of the PIG moving in a second direction that is not the first direction.

14. The method of claim 11, wherein the PIG is moving through the fluid conduit at a speed that is less than or equal to a maximum speed, and wherein the method further comprises filtering the PIG movement data by:

identifying in the PIG movement data, and discarding, PIG movement data indicative of the PIG moving at a speed that is greater than the maximum speed.

15. The method of claim 1, wherein extracting the one or more signatures for each parameter comprises, for each parameter:

extracting a first signature by determining average values of the parameter as a function of position along the fluid conduit and as a function of time.

16. The method of claim 1, further comprising, prior to determining the median of the diagonal differences, filtering the diagonal differences by discarding one or more diagonal differences that do no meet one or more slope requirements.

17. The method of claim 1, wherein extracting the one or more signatures for each parameter comprises extracting a third signature by, for each parameter:

for the determined diagonal differences of adjacent positions along the fluid conduit, determining a similarity of the determined diagonal differences; and based on the determined similarity, determining a mean of the determined diagonal differences.

18. A system comprising:

a fluid conduit;

one or more sensors positioned along the fluid conduit; and one or more processors and computer-readable medium storing computer program code configured when executed by the one or more processors to cause the one or more processors to perform a method comprising:

when a Pipeline Inspection Gauge (PIG) is moving through the fluid conduit, receiving interferometric data generated by the one or more sensors detecting one or more signals;

extracting parameter data from the interferometric data, wherein the parameter data comprises values of one or more parameters as a function of position along the fluid conduit and as a function of time; and generating, using the parameter data, PIG movement data indicative of a position of the PIG in the fluid conduit as a function of time, wherein generating the PIG movement data comprises:

extracting, from the parameter data, one or more signatures for each parameter; and generating, using the one or more signatures, the PIG movement data, and wherein extracting the one or more signatures for each parameter comprises extracting a second signature by, for each parameter:

determining diagonal differences of values of the parameter as a function of position along the fluid conduit and as a function of time; and determining, using the diagonal differences, a median of the diagonal differences relative to a set of predefined lines.

19. A system comprising:

a fluid conduit;

one or more lengths of optical fiber positioned along the fluid conduit, each length of optical fiber comprising one or more Fiber Bragg Gratings (FBGs);

an interrogator optically coupled to the one or more lengths of optical fiber and configured to interrogate the one or more lengths of optical fiber by transmitting one or more light pulses along the one or more lengths of optical fiber and detect reflections of the one or more light pulses from the FBGs; and one or more processors and computer-readable medium storing computer program code configured when executed by the one or more processors to cause the one or more processors to perform a method comprising:

when a Pipeline Inspection Gauge (PIG) is moving through the fluid conduit, causing the interrogator to interrogate the one or more lengths of optical fiber and receive reflections of the light pulses;

generating interferometric data from the received reflections;

extracting parameter data from the interferometric data, wherein the parameter data comprises values of one or more parameters as a function of position along the fluid conduit and as a function of time; and generating, using the parameter data, PIG movement data indicative of a position of the PIG in the fluid conduit as a function of time, wherein generating the PIG movement data comprises:

extracting, from the parameter data, one or more signatures for each parameter; and generating, using the one or more signatures, the PIG movement data, and wherein extracting the one or more signatures for each parameter comprises extracting a second signature by, for each parameter:

determining diagonal differences of values of the parameter as a function of position along the fluid conduit and as a function of time; and determining, using the diagonal differences, a median of the diagonal differences relative to a set of predefined lines.

20. A method of determining a position of a pipeline inspection gauge (PIG) in a fluid conduit, comprising:

while the PIG is moving through the fluid conduit, using one or more sensors positioned along the fluid conduit to detect one or more signals;

extracting parameter data from the detected one or more signals, wherein the parameter data comprises one or more parameters of the detected one or more signals as a function of time and position along the fluid conduit; and generating, using the parameter data, PIG movement data indicative of a position of the PIG in the fluid conduit as a function of time, wherein generating the PIG movement data comprises:

extracting, from the parameter data, one or more signatures for each parameter; and generating, using the one or more signatures, the PIG movement data, and wherein extracting the one or more signatures for each parameter comprises extracting a third signature by, for each parameter:

determining diagonal differences of values of the parameter as a function of position along the fluid conduit and as a function of time; and for the determined diagonal differences of adjacent positions along the fluid conduit, determining a similarity of the determined diagonal differences; and based on the determined similarity, determining a mean of the determined diagonal differences.

21. A system comprising:

a fluid conduit;

one or more sensors positioned along the fluid conduit; and one or more processors and computer-readable medium storing computer program code configured when executed by the one or more processors to cause the one or more processors to perform a method comprising:

when a Pipeline Inspection Gauge (PIG) is moving through the fluid conduit, receiving interferometric data generated by the one or more sensors detecting one or more signals;

extracting parameter data from the interferometric data, wherein the parameter data comprises values of one or more parameters as a function of position along the fluid conduit and as a function of time; and generating, using the parameter data, PIG movement data indicative of a position of the PIG in the fluid conduit as a function of time, wherein generating the PIG movement data comprises:

extracting, from the parameter data, one or more signatures for each parameter; and generating, using the one or more signatures, the PIG movement data, and wherein extracting the one or more signatures for each parameter comprises extracting a third signature by, for each parameter:

determining diagonal differences of values of the parameter as a function of position along the fluid conduit and as a function of time; and for the determined diagonal differences of adjacent positions along the fluid conduit, determining a similarity of the determined diagonal differences; and based on the determined similarity, determining a mean of the determined diagonal differences.

22. A system comprising:

a fluid conduit;

one or more lengths of optical fiber positioned along the fluid conduit, each length of optical fiber comprising one or more Fiber Bragg Gratings (FBGs);

an interrogator optically coupled to the one or more lengths of optical fiber and configured to interrogate the one or more lengths of optical fiber by transmitting one or more light pulses along the one or more lengths of optical fiber and detect reflections of the one or more light pulses from the FBGs; and one or more processors and computer-readable medium storing computer program code configured when executed by the one or more processors to cause the one or more processors to perform a method comprising:

when a Pipeline Inspection Gauge (PIG) is moving through the fluid conduit, causing the interrogator to interrogate the one or more lengths of optical fiber and receive reflections of the light pulses;

generating interferometric data from the received reflections;

extracting parameter data from the interferometric data, wherein the parameter data comprises values of one or more parameters as a function of position along the fluid conduit and as a function of time; and generating, using the parameter data, PIG movement data indicative of a position of the PIG in the fluid conduit as a function of time, wherein generating the PIG movement data comprises:

extracting, from the parameter data, one or more signatures for each parameter; and generating, using the one or more signatures, the PIG movement data, and wherein extracting the one or more signatures for each parameter comprises extracting a third signature by, for each parameter:

determining diagonal differences of values of the parameter as a function of position along the fluid conduit and as a function of time; and for the determined diagonal differences of adjacent positions along the fluid conduit, determining a similarity of the determined diagonal differences; and based on the determined similarity, determining a mean of the determined diagonal differences.

* * * * *